(12) United States Patent
Raymond

(10) Patent No.: US 8,157,326 B2
(45) Date of Patent: Apr. 17, 2012

(54) SEAT

(75) Inventor: Patrick Raymond, Brighton (GB)

(73) Assignee: Tech-Nicon International Management Services Limited (GB)

( * ) Notice: Subject to any disclaimer, the term of this patent is extended or adjusted under 35 U.S.C. 154(b) by 543 days.

(21) Appl. No.: 12/300,328

(22) PCT Filed: May 11, 2007

(86) PCT No.: PCT/GB2007/001755
§ 371 (c)(1),
(2), (4) Date: Nov. 10, 2008

(87) PCT Pub. No.: WO2007/132216
PCT Pub. Date: Nov. 22, 2007

(65) Prior Publication Data
US 2009/0242700 A1     Oct. 1, 2009

(30) Foreign Application Priority Data

May 11, 2006   (GB) .................................. 0609315.7

(51) Int. Cl.
*B60N 2/02* (2006.01)
(52) U.S. Cl. ..................... 297/333; 297/335; 297/300.3; 297/300.4; 297/302.2; 297/303.3
(58) Field of Classification Search ............... 297/300.2, 297/300.3, 300.4, 302.1, 302.2, 302.3, 332, 297/333, 335, DIG. 10
See application file for complete search history.

(56) References Cited

U.S. PATENT DOCUMENTS 2,057,687 A   10/1936  Manson ........................ 155/179
(Continued)

FOREIGN PATENT DOCUMENTS

CN           2712706           7/2005
(Continued)

OTHER PUBLICATIONS

International Search Report received in related PCT Application Serial No. PCT/GB2007/001755.
(Continued)

*Primary Examiner* — David Dunn
*Assistant Examiner* — David E Allred
(74) *Attorney, Agent, or Firm* — Hayes Soloway P.C.

(57) ABSTRACT

A seat comprising a seat pan (12) and a support structure, wherein the seat pan (12) is pivotally coupled to the support structure (8) about a first pivot axis (pi) provided across substantially the front of the seat pan (12), such that the seat pan (12) may be pivoted about the said first pivot axis (pi) in use, and the angle of the seat pan (12) relative to the support structure (18) may thus be adjusted. The seat further comprises a backrest (14), the backrest being coupled (p2) to substantially the rear of the seat pan (p12). Also provided is pneumatic apparatus for use with a seat, comprising one or more inflatable cushions for supporting a user in use. Further provided is an armrest comprising: a first pivot axis about which the armrest may be pivotally coupled to a seat, the first pivot axis being arranged to orient sideways out of the seat and thereby enable upward and downward rotation of the armrest in use; and a second pivot axis oriented parallel to the longitudinal dimension of the armrest, the armrest being rotatable about the second pivot axis in use.

28 Claims, 21 Drawing Sheets

U.S. PATENT DOCUMENTS

| | | | |
|---|---|---|---|
| 2,633,897 A * | 4/1953 | Moore | 297/302.3 |
| 2,991,125 A * | 7/1961 | Lie | 297/300.4 |
| 3,138,402 A * | 6/1964 | Heyl, Jr. et al. | 297/69 |
| 3,356,413 A | 12/1967 | Radke et al. | 297/300 |
| 3,640,566 A * | 2/1972 | Hodge | 297/68 |
| 3,851,917 A | 12/1974 | Horstmann et al. | 297/345 |
| 4,270,797 A * | 6/1981 | Brauning | 297/300.3 |
| 4,598,944 A | 7/1986 | Meyer et al. | 297/183 |
| 4,603,830 A | 8/1986 | Franck | 248/575 |
| 4,988,145 A * | 1/1991 | Engel | 297/300.4 |
| 5,104,191 A | 4/1992 | Tame | 297/417 |
| 5,328,239 A * | 7/1994 | Yamazaki | 297/333 |
| 5,346,280 A * | 9/1994 | Deumite | 297/330 |
| 5,505,518 A * | 4/1996 | Pike | 297/242 |
| 5,520,439 A * | 5/1996 | Blount | 297/330 |
| 5,556,121 A | 9/1996 | Pillot | 280/301.1 |
| 5,803,545 A * | 9/1998 | Guguin | 297/316 |
| 6,283,547 B1 | 9/2001 | Bauer et al. | 297/284.1 |
| 6,659,555 B1 * | 12/2003 | Scholz et al. | 297/302.2 |
| 6,811,225 B1 | 11/2004 | Konya et al. | 297/423.13 |
| 7,077,416 B2 * | 7/2006 | Duarte | 280/304.1 |
| 2001/0050500 A1 * | 12/2001 | Piretti | 297/300.2 |
| 2002/0171277 A1 * | 11/2002 | Bock | 297/300.2 |
| 2002/0190554 A1 * | 12/2002 | Kinoshita et al. | 297/300.3 |
| 2004/0212177 A1 | 10/2004 | Kuiken | 280/647 |
| 2005/0082895 A1 | 4/2005 | Kimming | 297/452.41 |

FOREIGN PATENT DOCUMENTS

| | | |
|---|---|---|
| DE | 3432084 | 3/1986 |
| DE | 4303021 A1 * | 8/1994 |
| DE | 19532302 | 3/1997 |
| EP | 0250207 | 12/1987 |
| EP | 0232687 | 12/1988 |
| EP | 0302315 | 2/1989 |
| EP | 0353210 | 1/1990 |
| EP | 1462030 | 9/2004 |
| EP | 1564066 | 8/2005 |
| EP | 1645507 | 4/2006 |
| GB | 486985 | 6/1938 |
| GB | 1264969 | 2/1972 |
| GB | 1273890 | 5/1972 |
| GB | 2034178 | 6/1980 |
| NL | 7903079 | 5/1980 |
| WO | WO 2007/003075 | 1/2007 |

OTHER PUBLICATIONS

Search Report received in related U.K. Application Serial No. GB0709154.9.

Search Report received in related U.K. Application Serial No. GB0609315.7.

Chinese Office Action English Translation only, Application No. 200780017033.5 dated Jun. 21, 2010 (7 pages).

* cited by examiner

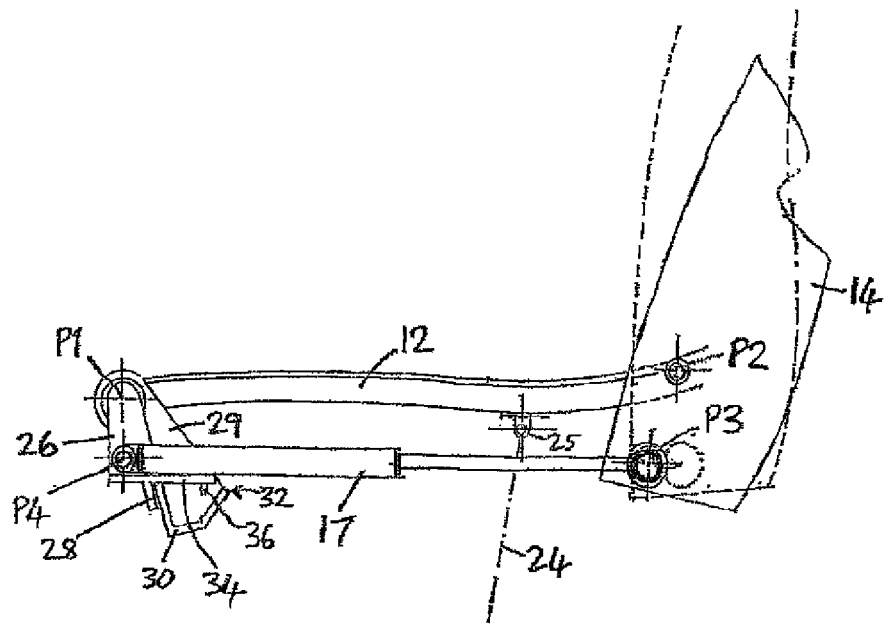
Figure 11
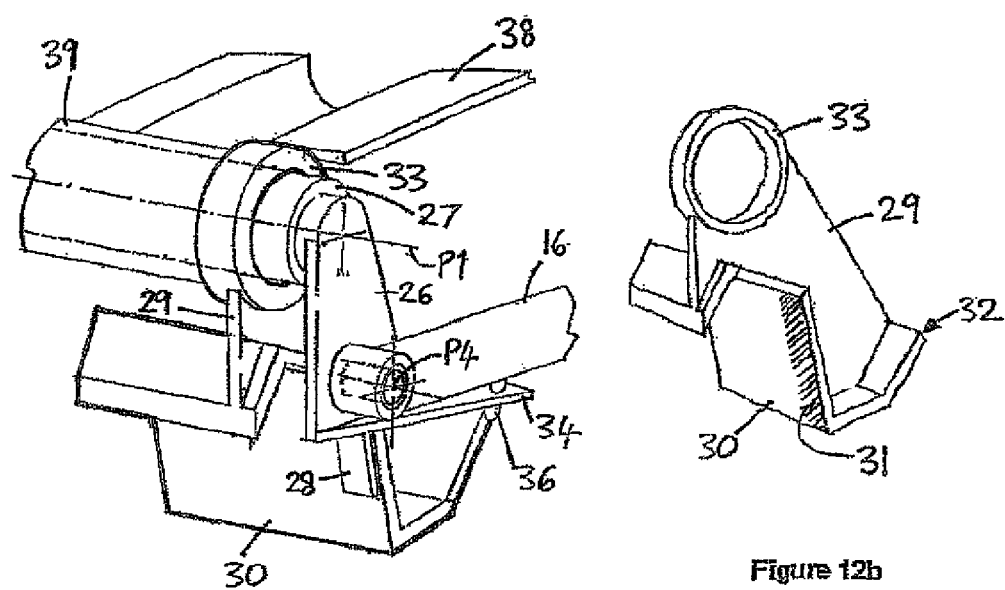
Figure 12a
Figure 12b

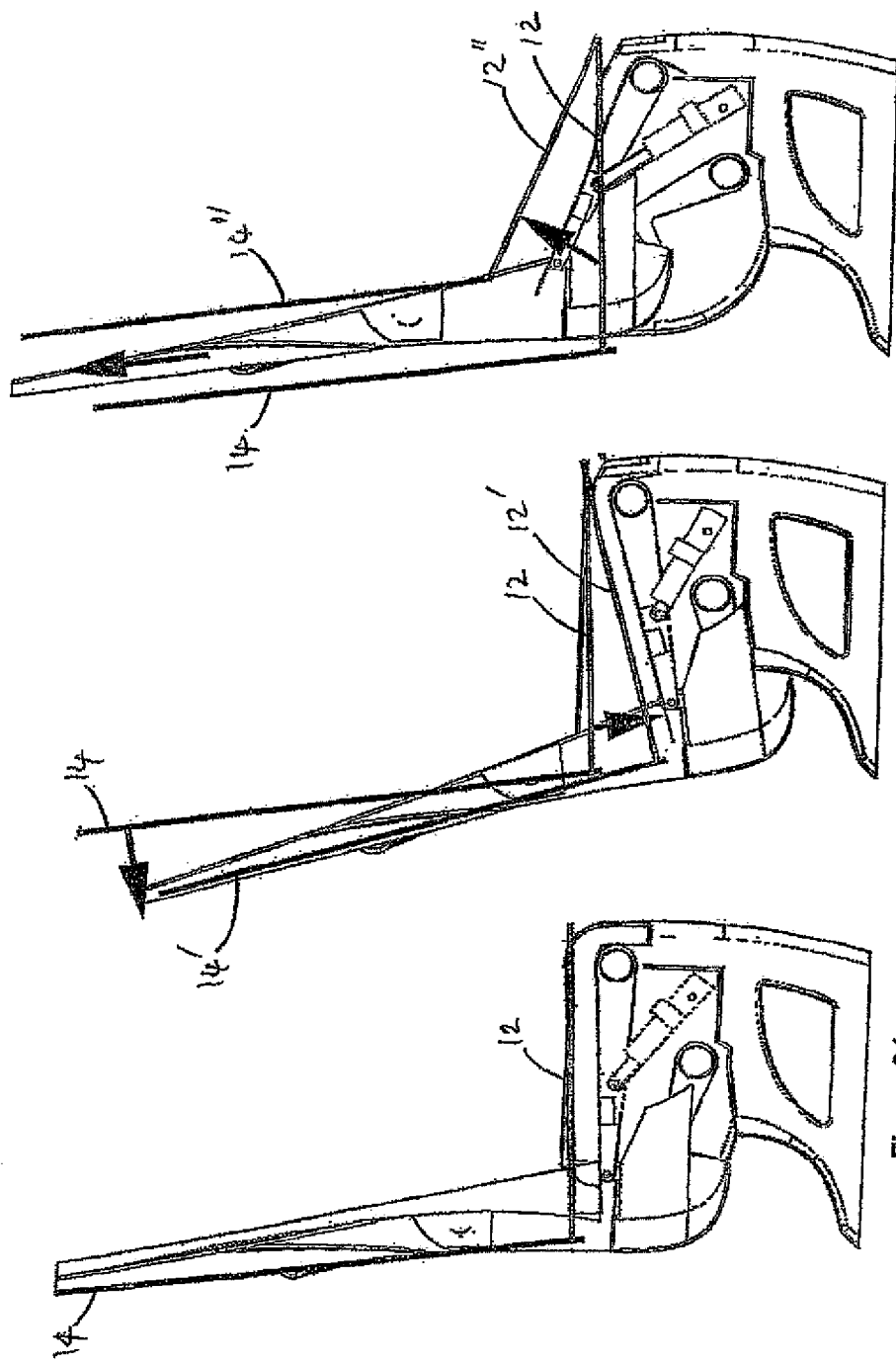

SEAT

This invention relates to a seat. It is particularly suitable, but not necessarily limited, for use especially in aeroplanes but also in trains, buses, coaches, or other forms of passenger transport. It is also suitable for use in offices, houses, theatres, concert halls, conference centres, hotels, and other locations.

BACKGROUND TO THE INVENTION

There are a wide variety of individual or mass transport passenger seats providing a variety of adjustability options and configurations to suit the user's need to change the posture of his body whilst seated. Examples of such seats include airline seats, train seats, bus seats, coach seats, and so on. Such seats may be fixed to a floor, or fixed to a frame wherein the frame is fixed to a floor. Typically, such seats are configured to offer a varying degree of fit to the user's morphology, anatomy, or change of posture. Such seats' adjustability options can include seat height adjustability from floor level, seat depth adjustability from front seat edge to base of back rest, backrest angle adjustability in relation to the seating surface, height of lumbar support from seating surface, and backrest height adjustability in relation to seating surface.

One of the simplest forms of seat adjustability is the ability to change the angle of the seat backrest in relation to a fixed seating surface. This is common in aeroplanes, trains and coaches. Reclining the backrest is generally performed by the user manually disengaging some kind of restraint mechanism, exerting pressure on the ground through his legs, and pushing back into the backrest using his back, against the action of a spring or other biasing means, in order to pivot the backrest about a pivot axis located across the rear of the seat pan. When the backrest is at the desired angle, the user re-engages the restraint mechanism. Raising the backrest towards an upright position is achieved by a similar process, allowing the spring or biasing means to assist with bringing the backrest upwards, but nevertheless also requiring the user to maintain pressure through his legs in order to control the motion of the backrest. Both these adjustment procedures, and in particular the reclining of the backrest, can put significant pressure on the user's thighs, and may be uncomfortable.

Additionally, with a conventional fixed horizontal seat pan, tilting the backrest backwards results in the user's body being pushed forward at the hip point and the body tending to slide away from the backrest, which creates a gap at the lower part of the back in which the back is not supported (hence the need to provide supplementary cushions on long haul flights).

More generally, a user of a passenger seat (for example, an airline seat, train seat, coach seat, bus seat, or such like) may experience discomfort during a journey. Whilst conventional reclining seats enable the user to adjust their back angle, they do not generally enable the user to change the pressure points (i.e. the parts of the user's body which bear pressure or stress) during the journey. As a consequence, the user may risk ailments such as deep vein thrombosis, due to the being substantially immobile for a long period of time, without being able to change the pressure points. There is therefore a desire to be able to adjust the pressure points experienced by a user during a journey.

It is also desired to reduce the weight of an aircraft seat. Once multiplied over all the seats in an aircraft, a weight saving may become very significant, and may enable the aeroplane to take off with a lower dead weight, or to use less fuel when flying and thereby reduce operating costs and exhaust emissions, or to carry more cargo.

Further problems relate to the cushions provided on conventional passenger seats. Conventional aircraft seat cushions are usually filled with foam, which can be relatively heavy. Foam cushions can also be relatively flammable, and may give rise to a risk of fire or smoke during a flight. In practice, the flammability of a foam-filled airline seat is often reduced by encasing the foam cushion in a protective fire barrier, but such fire barriers are generally made of an expensive cloth. There is therefore a desire to reduce the weight and the flammability of airline cushions, and also to reduce cost. Conventional foam cushions can also be somewhat unaccommodating for different users' body shapes and body weights; generally a foam cushion is really only suitable for a fairly narrow range of body weights and shapes.

SUMMARY OF THE INVENTION

According to a first aspect of the present invention there is provided a seat comprising a seat pan, a backrest and a support structure, wherein the seat pan is pivotally coupled to the support structure about a first pivot axis provided extending across the seat pan substantially at the front edge of the seat pan, such that the seat pan may be pivoted about the said first pivot axis in use, and the angle of the seat pan relative to the support structure may thus be adjusted, the backrest being pivotally coupled to the seat pan about a second pivot axis extending across the seat pan substantially at the rear of the seat pan, such that the angle of the backrest relative to the seat pan may be adjusted in use, the backrest being linked to the seat structure by an articulating linkage whereby in one mode of operation as the backrest moves forward during forward tilting movement of the seat from a rest position (whereat the seat pan is generally substantially horizontal or plane parallel to the floor) to a second position of the seat (whereat the seat pan is tilted forwardly) the seat pan rear tilts upwardly relative to the seat pan front and the backrest rises therewith but the angle between the seat pan and backrest adjusts substantially simultaneously so that the backrest's angle of incline relative to the floor level/horizontal is substantially unaltered.

Providing the first pivot axis extending across the seat pan substantially at the front edge of the seat pan provides the advantage that the user may readily change the pressure points (i.e. the parts of the user's body which bear pressure or stress) from one area of the body to another during a journey (e.g. on an aeroplane) or during some other extended period of being seated (e.g. in an office).

For example, by tilting the rear of the seat pan downwards (relative to the front of the seat pan), the user's bodyweight is transferred backwards, and pressure is transferred from his ischia to his back, such that less pressure is borne by his bottom and thighs. This reduces vascular and muscular stresses in his body, and enables blood to flow around his body more easily. Additionally, the pivoting movement may be performed in a comfortable manner, with the force for reclining the seat arising from the user simply leaning backwards, without needing to exert pressure though his legs. Also, because the first pivot axis is located at substantially the front of the seat pan, this allows the distance from the pivot axis to the floor to remain constant irrespective of the tilt angle of the seat pan and there is substantially no forward extending protrusion of the seat pan beyond the first pivot axis to tilt upwardly when the seat is reclined, and consequently pressure is not increased on the inside face of the knee when the rear of the seat pan is reclined. The inside face of the knee is the location of many veins and arteries that are not well protected by muscle or other cushioning soft tissue against external pressurisation. Consequently, this arrangement mitigates against, or reduces the likelihood of, the user suffering from deep vein thrombosis, localised pressure discomfort, muscular stress, or other such ailments.

Moreover, by tilting the rear of the seat pan upwards (relative to the front of the seat pan), this advantageously enables the user to adopt a leaning or partially standing posture, enabling the user to stretch his legs, and transferring much of the user's bodyweight to the legs. In such a position, little pressure is borne by the user's bottom and back. When the seat is in such a position, it is also a little more compact and advantageously provides more personal space for a passenger behind.

By enabling the rear of the seat pan to be adjusted between a downward tilted position (referred to as "Delta 1" herein) and an upward tilted position (referred to as "Delta 2" herein), via a substantially horizontal position (referred to as "Delta" herein), a range of body support positions may be provided to the user, which in turn enable a continuous range of muscular and vascular stress relief to be provided, and which enable the user to transfer the pressure points from one part of the body to another on a continuous, semi-continuous or as-desired basis.

Preferably the seat pan is coupled to a seat pan adjustment device, the seat pan adjustment device being operable to adjust the angle of the seat pan relative to the support structure in use. The seat pan adjustment device may be, for example, a gas strut or some other pneumatic, hydraulic or fluid-filled piston or telescopic strut, a motor, some other power-assisted mechanism, or a manual (or foot) operated mechanism.

Preferably the first pivot axis incorporates resilient means such as a torsion bar, a leaf spring or a coil spring. This advantageously provides spring means for assisting the tilting of the seat pan, and may also serve as a structural element linking the seat pan to the support structure. In the preferred embodiment, the use of a torsion bar in the first pivot axis advantageously enables a considerably more slender gas strut to be used as the seat pan adjustment device, and also enables a simpler adjustment mechanism to be employed. It will be appreciated that other resilient spring mechanisms or devices may be employed in the first pivot axis instead of, or in addition to, a torsion bar, leaf spring or coil spring. Moreover, such resilient spring mechanisms may also be employed in any of the other pivot axes described herein.

The seat comprises a backrest, the backrest being coupled to substantially the back of the seat pan. By virtue of the backrest being coupled to the seat pan, the backrest moves with the seat pan as the seat pan angle is adjusted. For example, if the back of the seat pan is tilted downwards, the backrest reclines accordingly. The backrest is pivotally coupled to the seat pan about a second pivot axis, such that the angle of the backrest relative to the seat pan may be adjusted in use. This enables the backrest angle to the floor to be adjusted independently of the seat pan angle to the floor.

Preferably the articulating linkage of the seat comprises a first structural member pivotally coupled to the backrest about a third pivot axis and pivotally coupled to the seat structure about a fourth pivot axis that is located towards the front of the seat pan, i.e. forwards of the third pivot and preferably at or near the front of the seat pan.

In one embodiment, the first structural member is of fixed length. However, in the preferred embodiments, the first structural member is of adjustable length, such that adjustment of its length causes the angle of the backrest relative to the seat pan to be adjusted.

In one embodiment the seat further comprises a second structural member arranged to couple the first pivot axis to the fourth pivot axis. Preferably the said first structural member is engageable with the said second structural member such that, when engaged, the first and second structural members are movable having a fixed angle relative to one another. Preferably one of the first or second structural members is provided with a pin or lug, and the other of the first or second structural members is provided with a recess or aperture in which the said pin or lug can locate. The first structural member may be provided with the said pin or lug, and the second structural member provided with the said aperture.

The second structural member is preferably provided with a flange against which the first structural member can abut. Preferably the first and second structural members are arranged such that the first structural member may pivot upwards relative to the second structural member during upward motion of the first structural member, but such that the first structural member is angularly engaged with the second structural member during downward motion of the first structural member. This enables the first structural member to be pivoted downwards, such that the seat reclines backwards (i.e. going from the "Delta" position into the "Delta 1" position), the angle of the backrest relative to the seat pan is maintained, and the user's weight is partially transferred from the seat pan onto the backrest, thereby altering the user's pressure points. However, if the first structural member is moved upwards, such that the seat pan tilts forwards (i.e, going from the "Delta" position into the "Delta 2" position), then the angle between the backrest and the seat pan becomes greater, which facilitates the user adopting a leaning or partially standing posture, and is consequently more comfortable.

Preferably the second structural member is provided with a stay arranged to butt against a third structural member when the first structural member is moved upwards, but such that the stay can move away from the third structural member when the first structural member is moved downwards. Particularly preferably the stay is arranged to butt against the third structural member substantially at the point during upward motion of the first structural member at which the first structural member disengages from the second structural member. This arrangement advantageously synchronises the disengagement of the first structural member from the second structural member with the point at which the seat pan begins to tilt forwards (i.e. going from the "Delta" position into the "Delta 2" position), yet ensures that the first structural member re-engages with the second structural member when the seat pan begins to tilt backwards (i.e. going from the "Delta" position into the "Delta 1" position). Preferably the third structural member is fixedly attached to, or integral with, the support structure. Preferably the seat pan adjustment device is pivotally coupled to the seat pan about a fifth pivot axis. The seat pan adjustment device may be attached to the support structure or the third structural member.

Preferably the seat further comprises one or more inflatable cushions for supporting a user in use. The use of inflatable cushions, instead of conventional foam-filled cushions, provides several benefits. Inflatable cushions are light in weight compared to foam-filled cushions, and accordingly provide a weight saving that is particularly beneficial in aerospace applications. For example, this may enable an aeroplane to take off with a lower dead weight, or to use less fuel when flying and thereby reduce operating costs and exhaust emissions, or to carry more cargo. Additionally, inflatable cushions may be formed of materials which are significantly less flammable than foam, and which do not require an expensive fire barrier and are therefore cheaper. Inflatable cushions may also readily accommodate different users' body shapes and body weights, in contrast to the fairly narrow range of body weights and shapes that may be accommodated by conventional foam-filled cushions. Preferably the seat comprises a plurality of inflatable cushions. This provides the advantage that separate inflatable cushions may be provided to correspond with certain parts or regions of the human body, and the properties of the cushions may be tailored specifically to suit the corresponding body parts/regions. In a preferred embodiment, the seat comprises an inflatable lumbar support cushion, an inflatable ischia support cushion, an inflatable shoulder support cushion and an inflatable thigh support cushion. This list is in no way exhaustive, and other cushions may be provided for other body parts or regions as appropriate.

Preferably the or each inflatable cushion comprises a plurality of inflatable cells. By forming a cushion from a plurality of discrete inflatable cells, this provides the advantage that, if the user shifts his body weight from side to side over a cushion, all the air in the cushion is not displaced to one side (i.e. to the opposite side from where the user's body is), as could happen if the cushion were a single air pocket. Instead, by forming a cushion from a plurality of inflatable cells, if the user's body weight is shifted to one side, the air is retained in the separate cells and is not all displaced to the opposite side. Thus, this provides consistent comfortable support for the user's body, irrespective of whether the user remains relatively still or moves from side to side. Preferably the seat further comprises one or more air bellows in fluid communication with one or more of the inflatable cushions. Such air bellows may advantageously be arranged such that they become compressed as the seat reclines or moves, thereby forcing more air into the corresponding inflatable cushion(s), and thereby dynamically changing the cushioning characteristics of the seat as the seat is reclined or moved. Thus, more cushioning may be automatically provided in a certain part of the seat when the seat is inclined such that the said part of the seat supports more of the user's weight. Preferably each of a plurality of inflatable cells within an inflatable cushion is provided with a separate valve. Such valves advantageously retain air in the said cells, and prevent air from being undesirably displaced from one cell to another, for example if the user shifts his body weight from side to side. Preferably the said one or more air bellows are arranged beneath the seat pan, such that reclining of the seat pan compresses the bellow(s) and increases the air pressure in the inflatable cushions.

The seat may further comprise an air pump operable to increase the pressure in one or more bellows or inflatable cushions. This pump (which may for example be hand- or foot-operated, or mechanically or electrically operated) advantageously enables the user to increase the air pressure in the inflatable cushions/cells/bellows, thereby increasing the firmness and plumpness of the cushions according to his personal preferences. The air pump may be arranged to increase the air pressure in only a certain bellow or cushion, rather than in the entire pneumatic system. Similarly, the seat may further comprise a pressure release valve operable to decrease the pressure in one or more bellows or cushions, to enable the user to decrease the pressure to suit his preferences. The pressure release valve may be arranged to decrease the air pressure in only a certain bellow or cushion, rather than in the entire pneumatic system.

Preferably the seat comprises a first bellow in communication with one or more inflatable cushions, and a second bellow in communication with another one or more inflatable cushions. For example, as in the presently preferred embodiment, the first bellow may be in communication with the lumbar support inflatable cushion and the ischia support inflatable cushion, and the second bellow may be in communication with the shoulder support inflatable cushion and the thigh support inflatable cushion. Providing separate bellows for specific inflatable cushions or cushion regions provides the advantage that the bellows may be arranged or configured differently, in order to provide different pressure change behaviour in response to the compression of the bellows. For example, as in the presently preferred embodiment, the first bellow may be larger than the second bellow, such that compression of both bellows in unison provides a greater increase in pressure in the cushions/cells connected to the first bellow, and a smaller increase in pressure in the cushions/cells connected to the second bellow.

The seat may further comprise an armrest, the armrest comprising: a first pivot axis about which the armrest is pivotally coupled to the seat, the first pivot axis being oriented sideways out of the seat and thereby enabling upward and downward rotation of the armrest in use; and a second pivot axis oriented parallel to the longitudinal dimension of the armrest, the armrest being rotatable about the second pivot axis in use. The first pivot axis enables the armrest to be folded away alongside a seat's backrest when not in use, and then lowered down when required. The provision of the second pivot axis advantageously enables the armrest to have a relatively small thickness compared to its width when in its in-use configuration, and enables the armrest to be rotated through 90° such that it may be stowed with its wide surface adjacent the backrest, and then may be folded down from the stowed position and rotated about the second pivot axis to bring the wide surface uppermost for the user to rest their arm on. This provides a significant benefit in that the armrest occupies minimal space when stowed, occupying less space than conventional armrests which pivot about a single axis only. A further benefit is that the armrest takes up a minimum amount of swept space during its deployment from its stowed position to its in-use position, and may therefore be used in applications where space is at a premium.

Preferably the armrest further comprises extending means coupled to the second pivot axis and operable to enable the end of the armrest to be extended away from the first pivot axis. This advantageously enables the length of the armrest to be adjusted to suit users of different arm lengths and anatomical proportions. Particularly preferably the extending means comprise a shaft slideable within the armrest. Other extending means are possible, such as a gas strut or a hydraulic, pneumatic or motorised assembly, for example. Preferably the armrest has a relatively small thickness compared to its width when in its in-use configuration. Preferably the armrest is profiled to conform around a user's body when in its in-use configuration. This increases the amount of usable armrest space available to the user, without encroaching on a neighbouring passenger's space.

According to a second aspect of the present invention there is provided pneumatic apparatus for use with a seat, comprising one or more inflatable cushions for supporting a user in use.

According to a third aspect of the present invention there is provided an armrest comprising: a first pivot axis about which the armrest may be pivotally coupled to a seat, the first pivot axis being arranged to orient sideways out of the seat and thereby enable upward and downward rotation of the armrest in use; and a second pivot axis oriented parallel to the longitudinal dimension of the armrest, the armrest being rotatable about the second pivot axis in use.

According to a further aspect of the present invention there is provided a passenger seat for an aircraft wherein the backrest has a shell that has a marked forwardly concave, rearwardly convex curved cross-section in its lower region whereby a passenger/person seated immediately behind the seat is afforded additional legroom for their knees that is suitably of the order of 5 cm and greater and preferably 10 cm and greater. Particularly preferably the backrest has a relatively flat cross-section in its upper region.

Features mentioned above with respect to the first aspect of the invention may be applied in any combination to the second, third or fourth aspects of the invention, as those skilled in the art will appreciate.

BRIEF DESCRIPTION OF THE DRAWINGS

Embodiments of the invention will now be described, by way of example only, and with reference to the drawings in which:

FIG. 11 illustrates the structure of FIG. 10, with the length of the variable-length connecting rod having been shortened in order to cause the backrest to tilt backwards without adjusting the angle of the seat pan;

FIG. 12a illustrates the pivot arrangement at the front of the seat pan;

FIGS. 12b, 13, 14 and 15 illustrate components of the pivot arrangement of FIG. 12a;

FIGS. 16b, 17, 18 and 19 illustrate components of the pivot arrangement of FIG. 16a;

FIGS. 28a, 28b and 28c illustrate respectively the profile of the folding armrest from above in use, from the side in use, and end on;

FIGS. 34a to 34c are schematic side elevation views that summarise the relationship of the seat pan to backrest in each of the Delta, Delta 1 and Delta 2 positions, respectively.

DETAILED DESCRIPTION OF PREFERRED EMBODIMENTS

Figure 1:
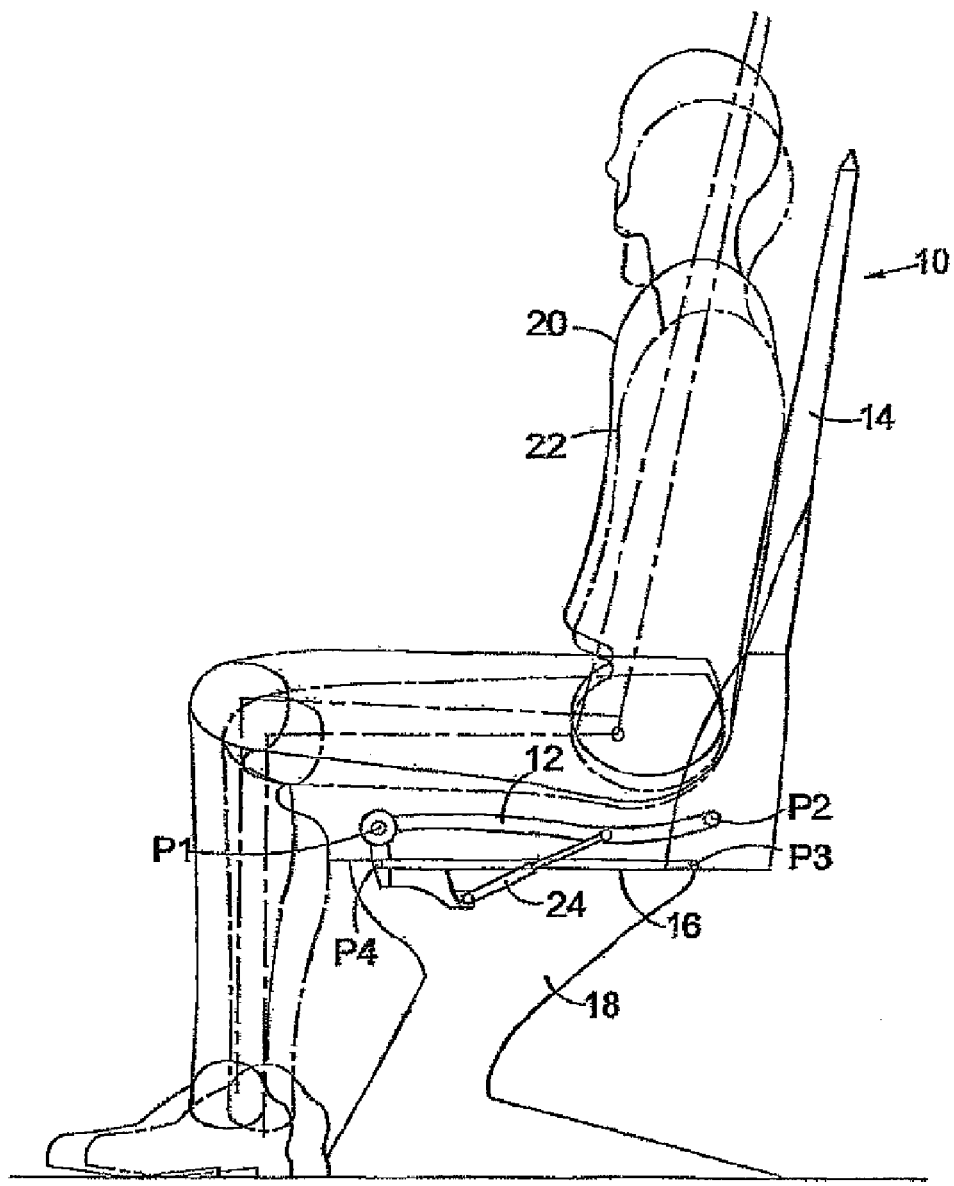
FIG. 1 illustrates a side view of a passenger seat, with the set pan being substantially horizontal such that the seat is in the "Delta" position.

The preferred embodiments will be described and illustrated in relation to a passenger seat as used in aeroplanes. The principles described herein are also applicable to other forms of chairs or seats, in particular office chairs, and seats and chairs found other locations. In the figures, like elements are indicated by like reference numerals throughout.

Seat Kinematics

By way of an initial overview, FIG. 1 illustrates a first embodiment of a passenger seat 10, comprising a seat pan 12 and a backrest 14. The seat pan 12 is pivotally coupled to a support structure 18 about a first pivot axis P1 that is fixed relative to the floor and does not move during the adjustments of the seat described below. The support structure 18 may be any kind of substructure on which the seat pan is supported, and may for example be a base or frame which forms part of the passenger seat 10, or a part of the vehicle in which the passenger seat 10 is mounted. The pivot axis P1 is located at substantially the front edge of the seat pan 12.

In a very basic embodiment, the backrest may be rigidly attached in a fixed angle to the seat pan. However, in more preferred embodiments, the backrest 14 is pivotally coupled to the seat pan 12 about a second pivot axis P2. In any case, the backrest 14 has no direct connection with the support structure 18, and accordingly the action of pivoting the seat pan 12 about the pivot axis P1 also causes the backrest 14 to rotate about pivot axis P1.

FIGS. 1 to 6 illustrate the kinematics of the preferred embodiments using two typical human profiles. The larger human outline 20 is representative of a man 1.82 meters tall, and the smaller outline 22 is representative of a man 1.70 meters tall. In FIGS. 1 to 6 (and also in subsequent figures), cushions, upholstery and the like have been omitted in the interest of clarity. In FIG. 1, the seat pan 12 is in a substantially horizontal orientation relative to the floor, and the backrest 14 is in a substantially upright position. With the seat pan 12 in this substantially horizontal orientation, the passenger seat 10 is said to be in the "Delta" position.

The angle of the seat pan 12 relative to the support structure 18 may be controlled and adjusted by a seat pan adjustment device 24, which may be a gas strut or any other variable-length structural member such as a threaded shaft, a telescopic shaft or a stepped strut. The seat pan adjustment device 24 acts between the underside of the seat pan 12 and the support structure 18, and can be locked at any desired length in order to retain the seat pan at a desired angle.

Figure 2:
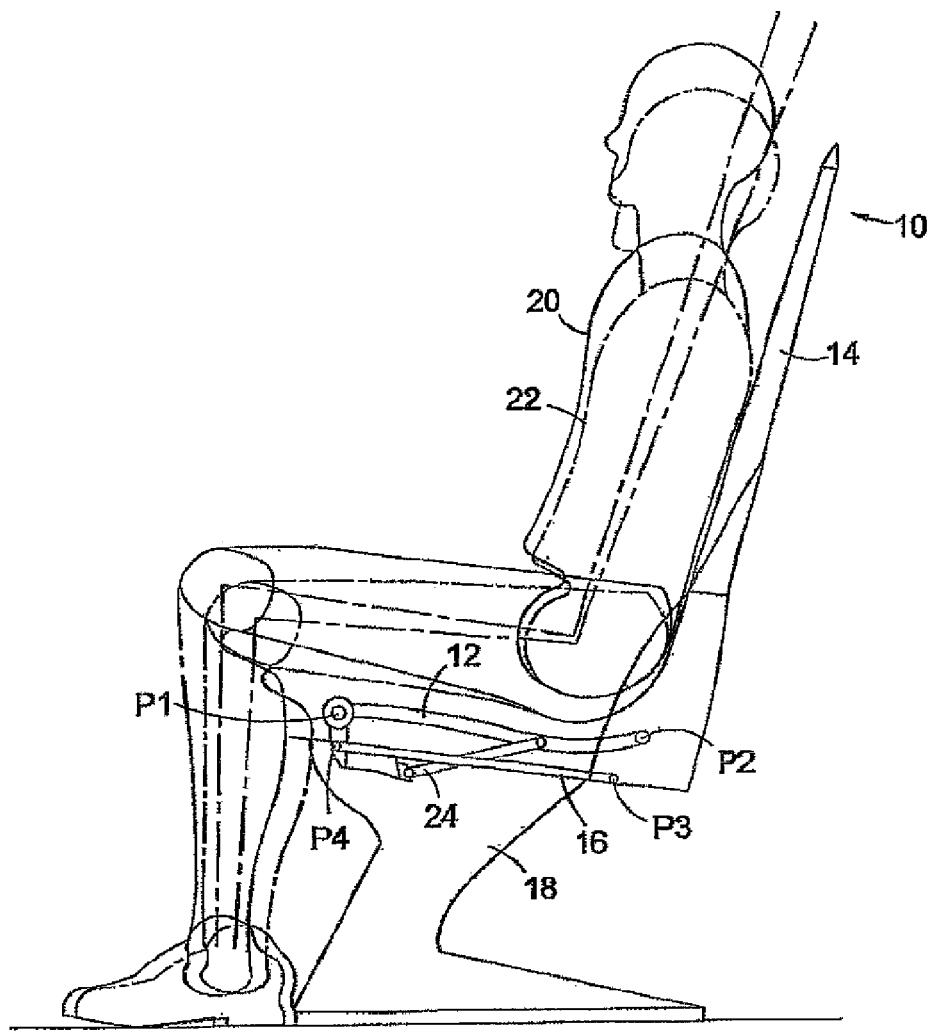
FIG. 2 illustrates the passenger seat of FIG. 1, with the seat pan tilted backwards such that the seat adopts the reclined "Delta 1" position.

FIG. 2 illustrates the passenger seat 10 of FIG. 1, but with the seat pan 12 tilted backwards and downwards about pivot axis P1, such that the seat adopts the so-called "Delta 1" position. In this position, the back of the human body 20 has reclined backwards through an angle A from its position in FIG. 1, resulting in the user's weight being transferred from the ischia to the back, thus reducing the pressure on the user's bottom and thighs. When moving from the "Delta" position of FIG. 1 to the "Delta 1" position of FIG. 2, the angle between the seat pan 12 and the backrest 14 has remained constant, such that the angle A through which the back of the human body has reclined is determined by the angle through which the seat pan 12 has tilted backwards. It should be noted that the triangle formed by the user's foot, the user's knee, and the pivot axis P1, remains unchanged when going from the "Delta" position of FIG. 1 to the "Delta 1" position of FIG. 2.

Figure 3:
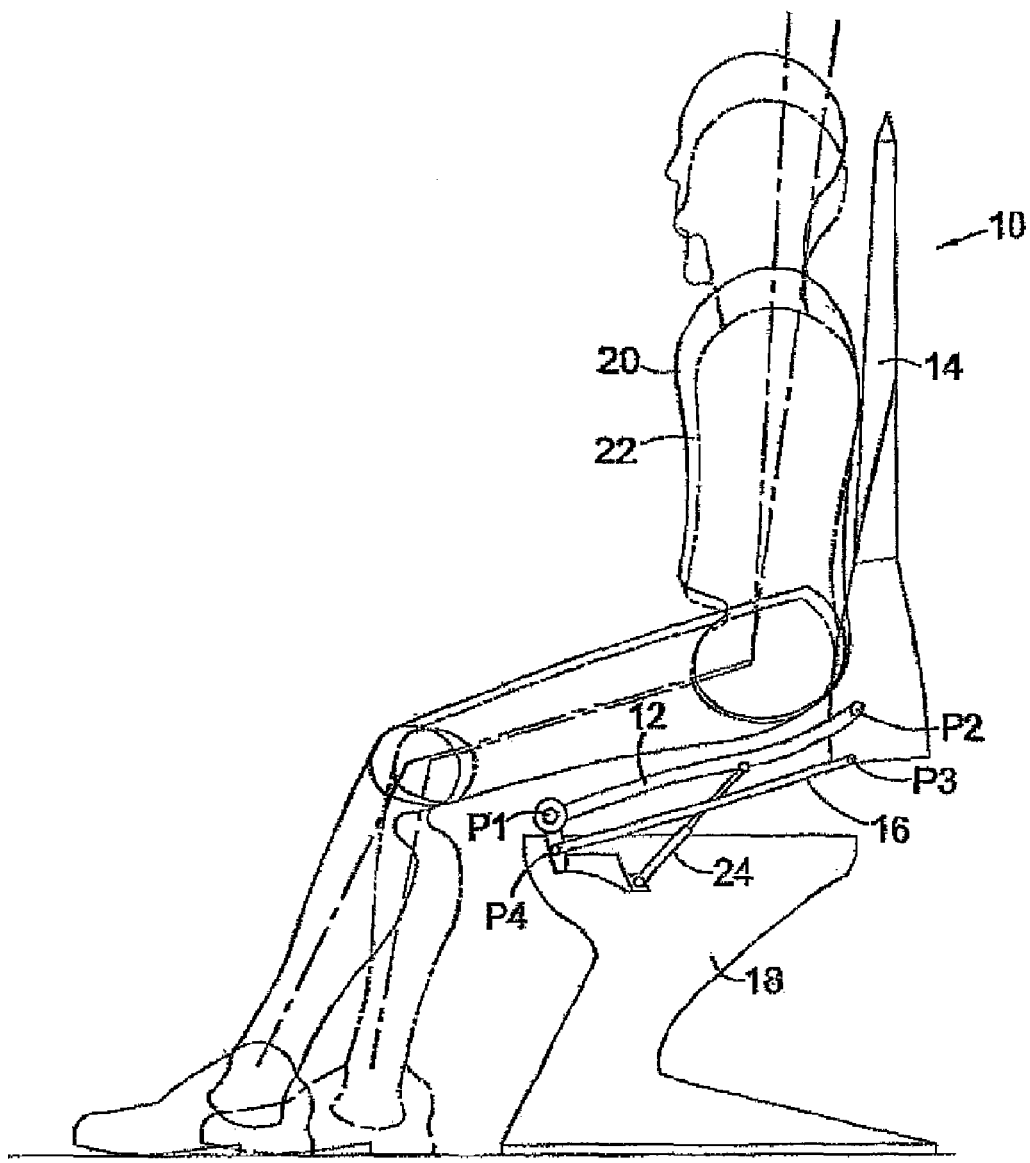
FIG. 3 illustrates the passenger seat of FIGS. 1 and 2, with the seat pan tilted forwards such that the seat adopts the "Delta 2" position.

In FIG. 3, the seat pan 12 is tilted forwards about pivot axis P1, such that the seat 10 adopts the so-called "Delta 2" position. It should be noted that when going from the "Delta" position to the "Delta 2" position, the angle between the seat pan 12 and the backrest 14 has increased, thereby enabling the human body 20 to adopt a more upright leaning or partially standing posture. The pivot mechanism which restrains the angle between the seat pan 12 and the backrest 14 when going from the "Delta" position to the "Delta 1" position, but which allows the angle between the seat pan 12 and the backrest 14 to increase when going from the "Delta" position to the "Delta 2" position, is described in detail below. With the seat in the "Delta 2" position, the user adopts a very natural semi-standing position, in which approximately three-quarters of the user's bodyweight is supported by their legs. Very little pressure is placed on the user's bottom and back. Advantageously, in this posture, there is no vascular compression in the user's legs.

Figure 4:
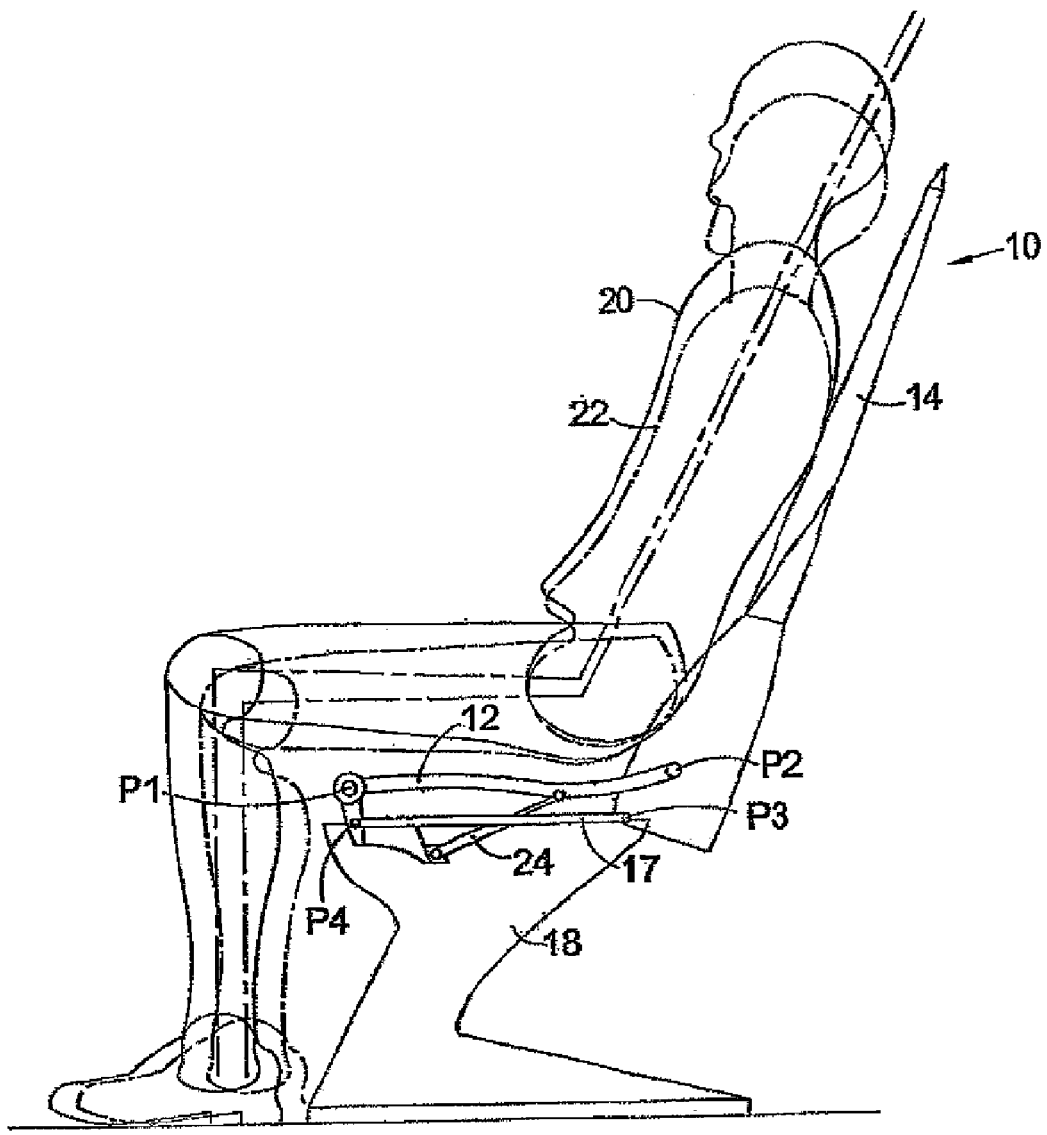
FIG. 4 illustrates a passenger seat similar to that shown in FIG. 1, but with an adjustable-length connecting rod member which enables the backrest to be reclined whilst maintaining the seat pan in whichever angle is desired relative to the floor (here shown in the "Delta" position)
Figure 5:
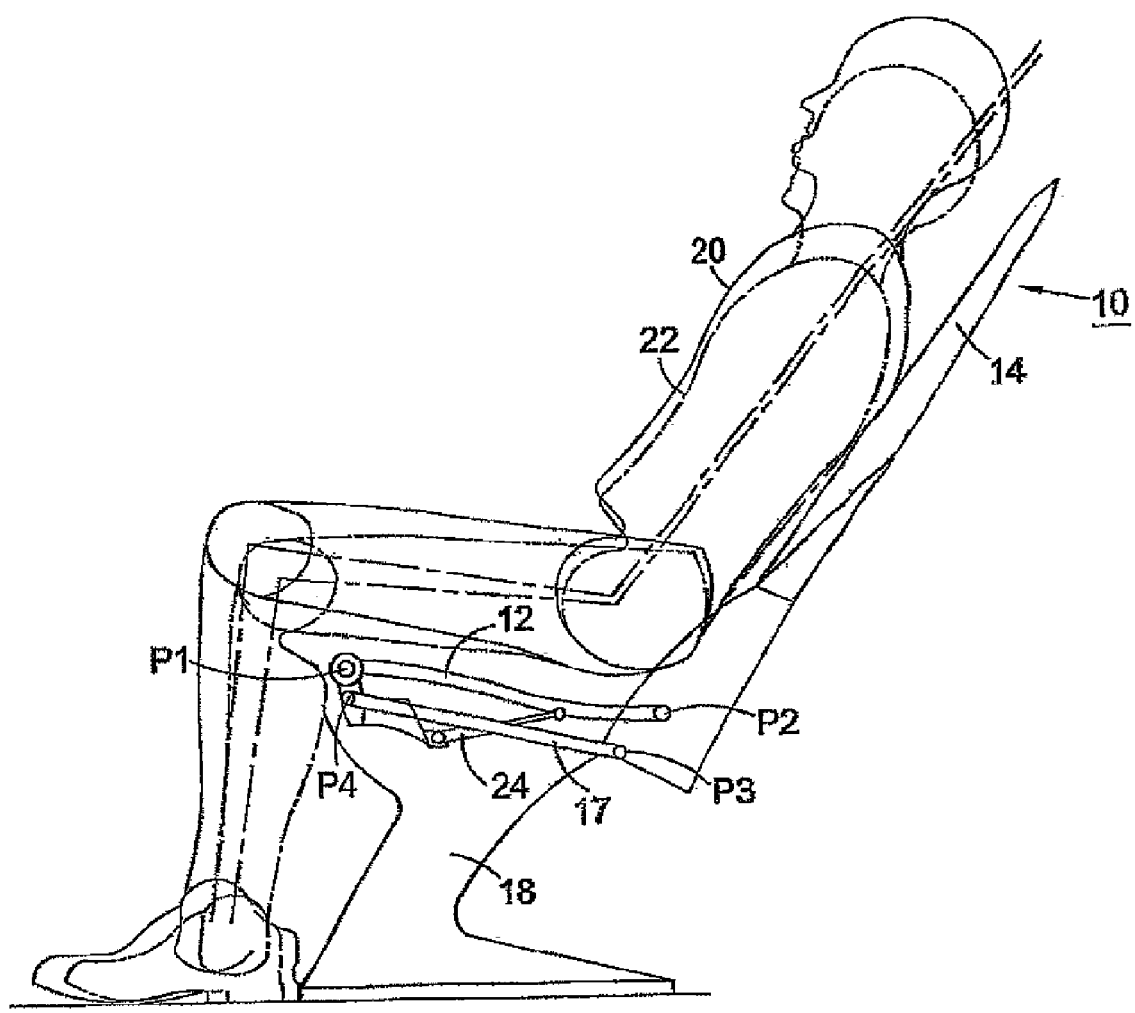
FIG. 5 illustrates the passenger seat of FIG. 4, with the seat pan tilted backwards such that the seat adopts the reclined "Delta 1" position, and with the adjustable-length connecting rod member enabling the backrest to be reclined further.
Figure 6:
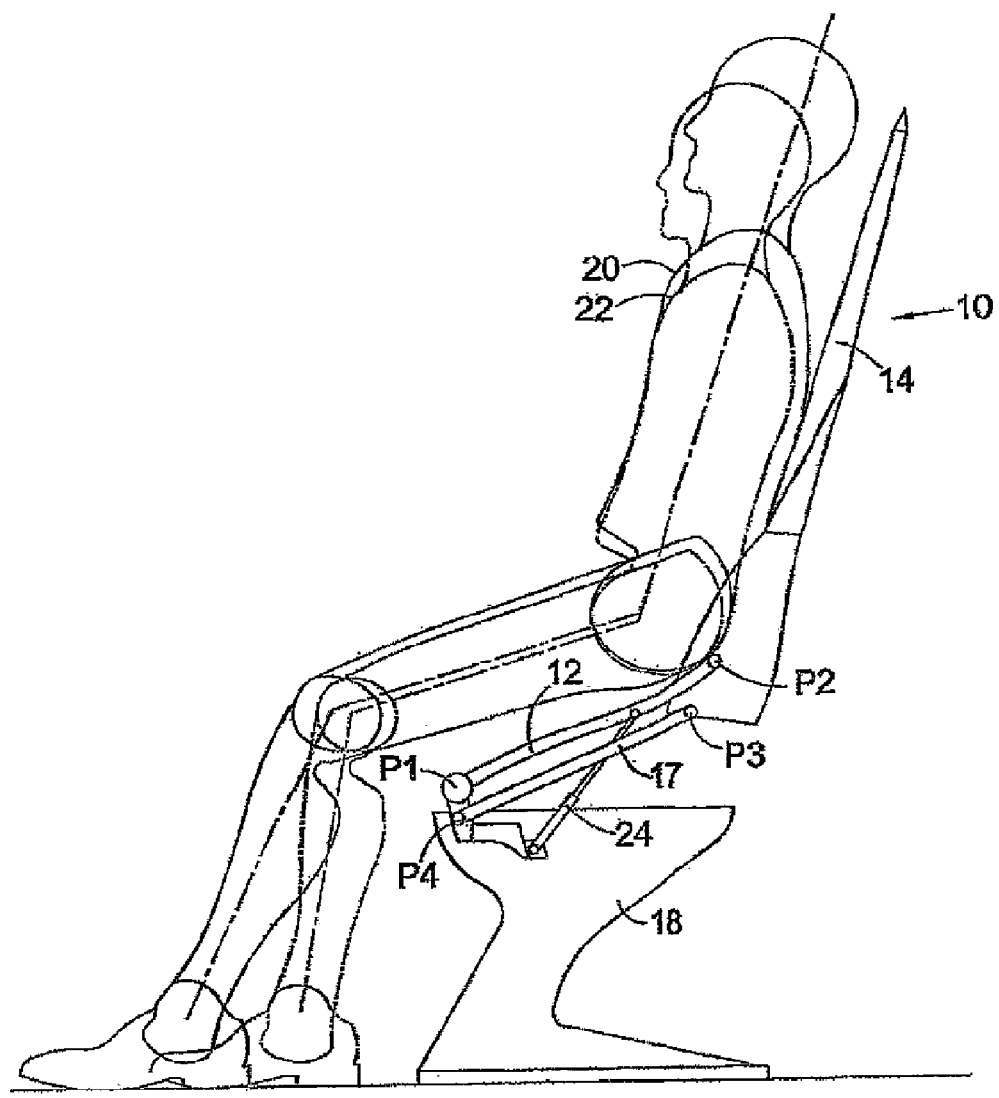
FIG. 6 illustrates the passenger seat of FIGS. 4 and 5, with the seat pan tilted forwards such that the seat adopts the "Delta 2" position, and with the adjustable-length connecting rod member enabling the backrest to be reclined further.

In FIGS. 1, 2 and 3 (and subsequent Figures), it will be noted that there is a third pivot axis P3 provided beneath pivot axis P2 in the backrest 14. Pivot axis P3 is coupled to a fourth pivot axis P4 which is close to the pivot axis P1 of the seat pan 12. In FIGS. 1, 2 and 3, pivot axes P3 and P4 are coupled by a fixed-length connecting rod 16. In FIGS. 4, 5 and 6, however, pivot axes P3 and P4 are coupled by a variable-length connecting rod 17, such that its length may be adjusted by the user 20 in use. The connecting rod 17 may be any kind of variable-length structural member, such as a gas strut, a stepped strut, a telescopic shaft or a threaded shaft, for example. By virtue of the connecting rod 17 being of variable length, this enables the user 20 to adjust the angle of the backrest 14 relative to the seat pan 12 by altering the length of the connecting rod 17 and thereby causing the backrest to pivot about pivot axis P2, independent of the angle of the seat pan 12.

As illustrated in FIG. 4, with the seat pan 12 in the substantially horizontal "Delta" position, shortening the length of the connecting rod 17 relative to the length of the connecting rod 16 in FIG. 1 causes the backrest 14 to recline backwards to an angle B. In FIG. 5, the seat pan 12 is in the backward-tilted "Delta 1" position. It can be seen that shortening of the connecting rod 17 (relative to the length of the connecting rod 16 in FIG. 2) causes the backrest to be tilted further backwards into angle B, which is greater than the angle A identified in FIG. 2. In FIG. 6, the seat pan 12 is in the forward-tilted "Delta 2" position. Shortening of the connecting rod 17 (relative to the length of the connecting rod 16 in FIG. 3) causes the backrest 14 to pivot backwards into angle B, which is greater than the angle A illustrated in FIG. 3. The seat configuration illustrated in FIG. 6 provides a more elongate body support structure compared to that of FIG. 3, which enables the user to stretch out their body more. This may be beneficial during long distance flights, for example.

Figure 7:
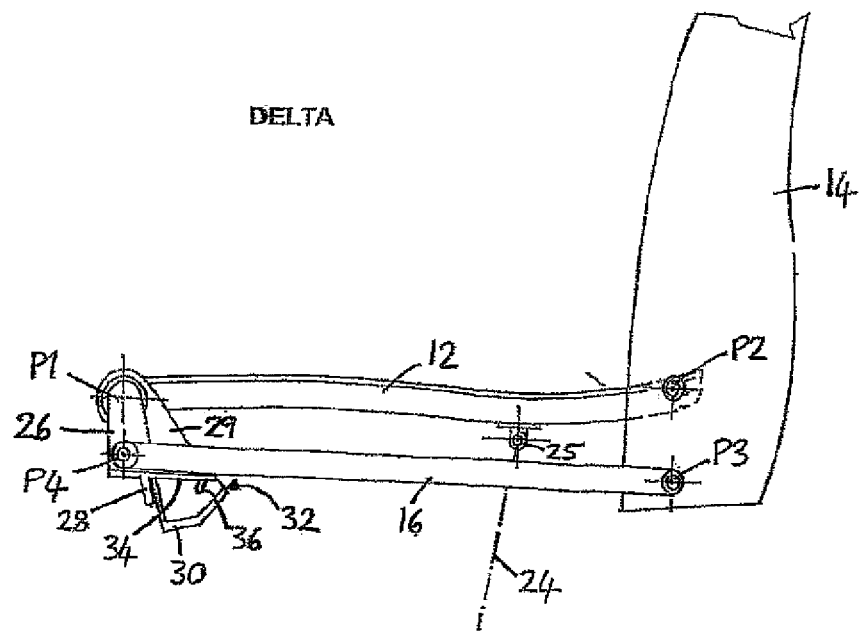
FIG. 7 illustrates a cross-section through the seat structure, showing the seat pan in the substantially horizontal "Delta" position.

FIG. 7 illustrates in more detail the pivot mechanism and fixed-length connecting rod 16 employed in the passenger seat 10 of FIGS. 1, 2 and 3. The seat pan 12 is pivotally coupled to the support structure 18 via a mounting bracket 29 (see FIGS. 12a and 12b for detail of the mounting bracket 29). The seat pan 12 is pivotable about the first pivot axis P1. The backrest 14 is pivotally coupled to the seat pan 12 about the second pivot axis P2. A cam member 26 is also pivotally coupled to the first pivot axis P1 (see FIG. 13 for detail of the cam member 26). One end of the fixed-length connecting rod 16 is pivotally coupled to the backrest 14 about the third pivot axis P3. The other end of the fixed-length connecting rod 16 is pivotally coupled to the cam member 26 about the fourth pivot axis P4. The seat pan adjustment device 24, e.g. a gas strut, is pivotally coupled to the underside of the seat pan 12 about a fifth pivot axis 25.

The mounting bracket 29, the cam member 26, and the connecting rod 16, are configured to restrain the angle between the connecting rod 16 and the cam member 26 when the seat pan 12 tilts downwards from the "Delta" position into the "Delta 1" position, but to enable the connecting rod 16 to angle freely relative to the cam 26 when the seat pan 12 tilts upwards from the "Delta" position into the "Delta 2" position. This is achieved by the provision of a flange 34 which protrudes laterally from the cam member 26. The flange 34 is arranged such that the connecting rod 16 can pivot freely during upward motion away from the flange 34, but such that the connecting rod 16 abuts against the flange 34 during downward motion. Engagement between the connecting rod 16 and the flange 34 is further enhanced by the provision of a locking pin or lug 36 on the connecting rod 16. The lug 36 is adapted to locate into a corresponding aperture, hole or recess provided in the flange 34. Thus, during downward tilting of the seat pan 12, the connecting rod 16 engages with the flange 34 and accordingly the angle between the connecting rod 16 and the cam member 26 is fixed. Overall, during downward tilting of the seat from the "Delta" position to the "Delta 1" position, the axes P1, P2, P3 and P4 are constrained in a substantially rectangular configuration.

Figure 8:
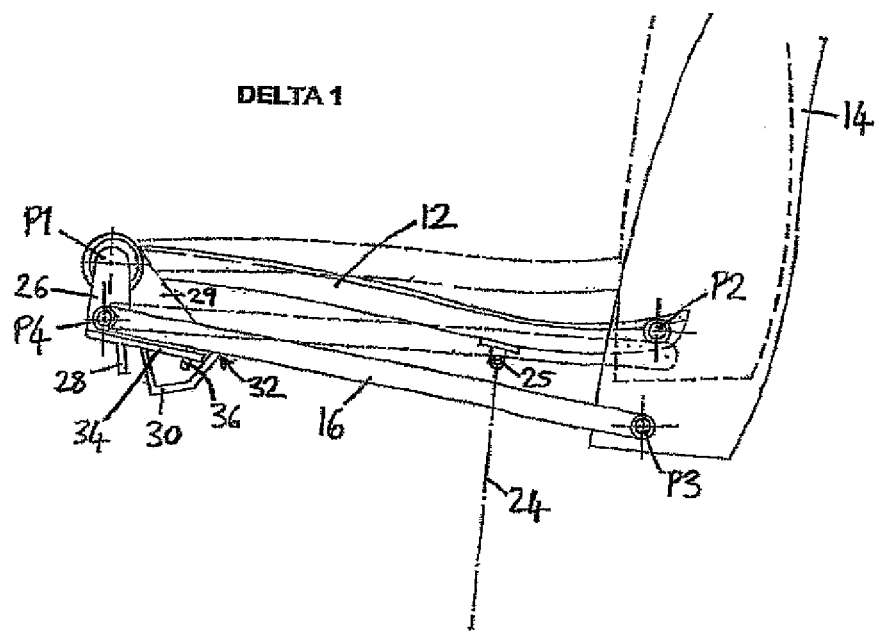
FIG. 8 illustrates the structure of FIG. 7, but with the seat pan having been tilted backwards into the "Delta 1" position.

The connecting rod 16 remains engaged with the flange 34 during subsequent upward travel of the seat pan 12 from the "Delta 1" position back into the "Delta" position. As illustrated in FIG. 8, the overall extent of the downward tilting of the seat pan 12 from the "Delta" position to the "Delta 1" position may be limited by the shape of the angular part 30 of the mounting bracket 29, and the position of the edge 32 of the angular part 30 against which the connecting rod 16 can abut.

Figure 9:
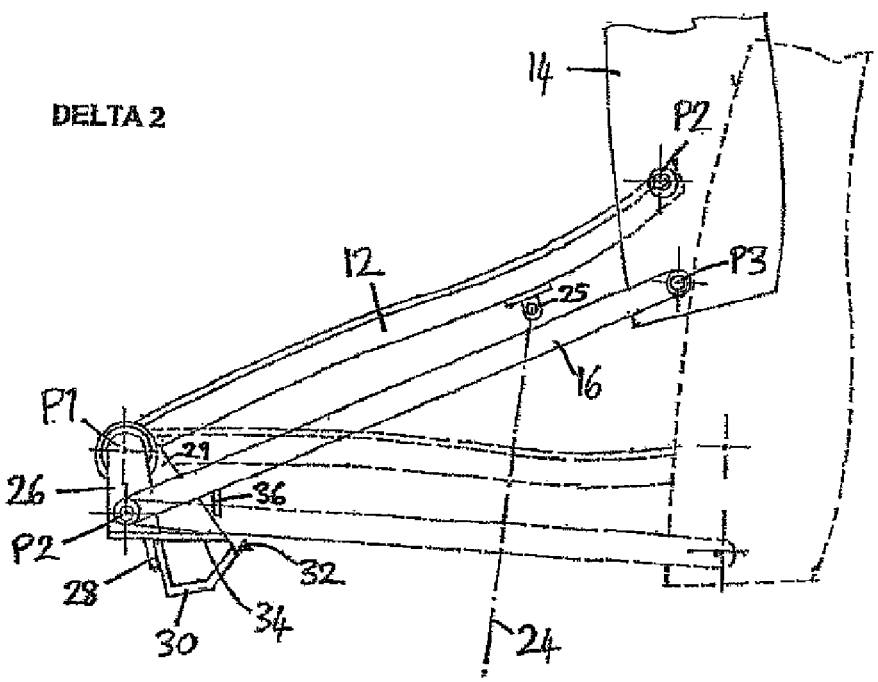
FIG. 9 illustrates the structure of FIG. 7, but with the seat pan having been tilted upwards into the "Delta 2" position.

As illustrated in FIG. 9, during upward travel of the seat pan 12 from the "Delta" position to the "Delta 2" position, the lug 36 disengages from the flange 34, enabling the connecting rod 16 to pivot freely with respect to the cam member 26. Upward pivoting of the cam member 26 is restrained by a stay 28 which protrudes from the underside of the flange 34 of the cam member 26. The stay 28 is arranged to abut the outside of the angular part 30 of the mounting bracket 29, in the shaded region 31 indicated in FIG. 12*b*. The stay 28 is arranged to butt against the angular part 30 of the mounting bracket 29 substantially at the point during upward motion of the connecting rod 16 at which the lug 36 disengages from the flange 34. During upward motion of the seat pan 12 from the "Delta" position to the "Delta 2" position, the pivot axes P1, P2, P3 and P4 move substantially as a parallelogram, with axis P2 moving around axis P1, and axis P3 moving around axis P4.

It will be appreciated that structural members associated with the support and tilting of the seat pan 12 may be provided in pairs, one on either side of the seat. For example, two mounting brackets 29 are provided, one on either side of the seat. Moreover, there may also be two connecting rods 16 and two cam members 26, one on either side of the seat, in order to enhance the structural rigidity of the seat and the robustness of the tilting mechanism. As mentioned above, the connecting rod 16 need not be of fixed length, and indeed a variable-length connecting rod 17 advantageously enables the angle of the backrest 14 to be adjusted independent of the angle of the seat pan 12. Thus, the angle of the backrest 14 may be independently adjusted when the seat pan 12 is in the "Delta", "Delta 1" or "Delta 2" positions, or anywhere in-between.

Figure 10:
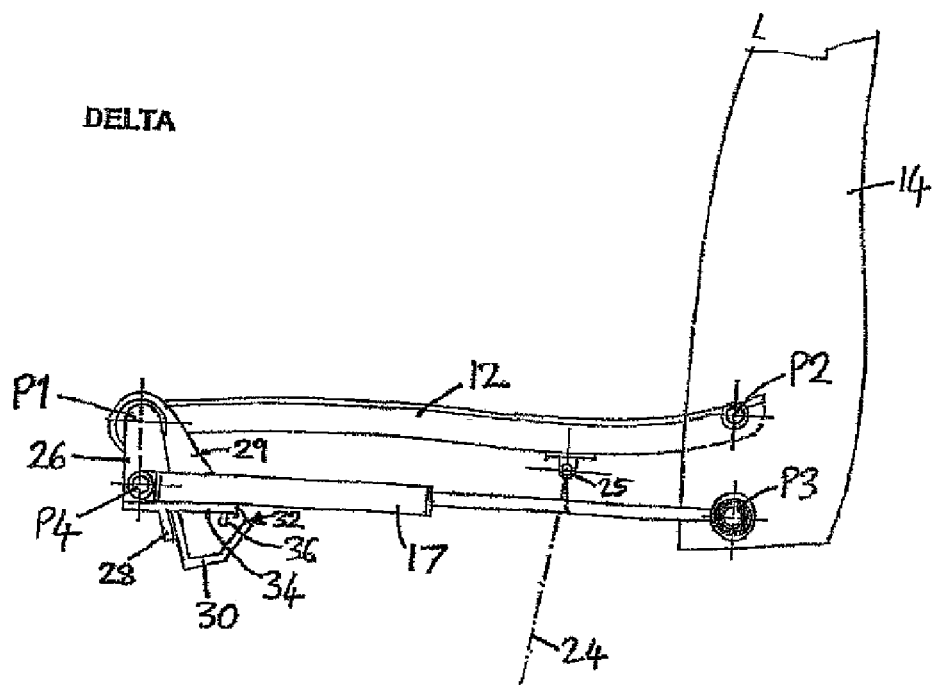
FIG. 10 illustrates a variant of the structure shown in FIG. 8, but incorporating a variable-length connecting rod instead of a fixed-length connecting rod, enabling the backrest to be reclined whilst maintaining the seat pan in whichever angle is desired relative to the floor (here shown in the "Delta" position)

FIGS. 10 and 11 illustrate a seat assembly broadly similar to that of FIG. 7, but showing the ability to adjust the angle of the backrest by adjusting the length of the connecting rod 17. The variable-length connecting rod 17, which connects between pivot axis P3 and pivot axis P4, may be, for example, a gas strut, a telescopic shaft, a stepped strut or a threaded shaft. The variable-length connecting rod 17 may be connected to the backrest 14 using a compliance bush at pivot axis P3. In FIG. 10, the seat pan 12 is in the "Delta" position (also indicated with a broken fine in FIG. 11). As shown in FIG. 11, shortening of the connecting rod 17 causes pivot axis P3 to be moved towards pivot axis P4 along the centre line of the connecting rod 17, and consequently the backrest 14 tilts backwards. In the "Delta" and "Delta 1" positions, due to the engagement of the connecting rod 17 with the flange 34 of the cam member 26, the angular relationship between axes P1, P2 and P4 remains fixed. In the "Delta 2" position, however, the lug 36 is freed from the flange 34, and axes P1, P2 and P4 can behave in the same way as described above in connection with the fixed connecting rod 16 when going into the "Delta 2" configuration.

Figure 13:
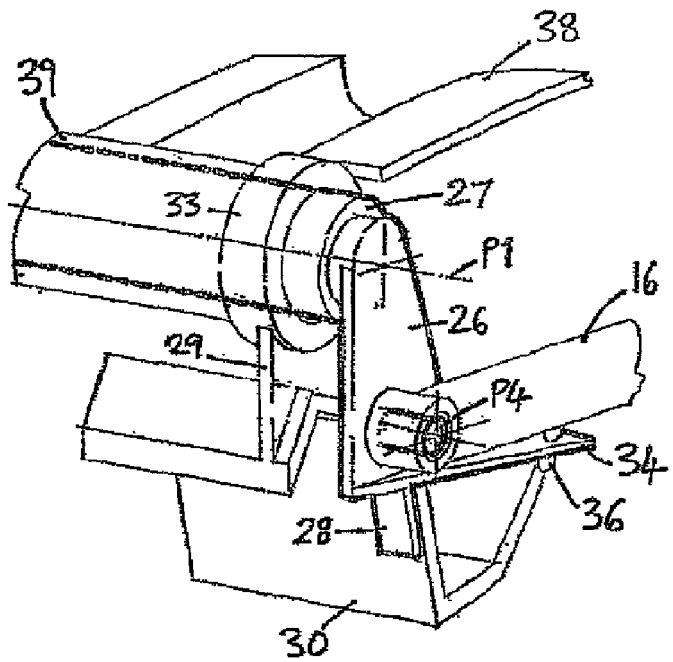

FIGS. 12*a* and 12*b* illustrate the mounting bracket 29 in more detail. The angular part 30 of the mounting bracket 29 is used to attach the seat assembly to the support structure or substructure. An annulus 33 is provided at the top of the mounting bracket 29, through which the pivot axis P1 is located. The cam member 26 is pivotally mounted through the annulus 33. The seat pan 12 is also pivotally coupled to the annulus 39 via a mounting bracket 38 and a shaft 39. FIG. 13 illustrates the cam member 26 in more detail. The cam member 26 is provided with a shaft 27 which is rotatably located through the annulus 33, thus enabling the cam member 26 to pivot about the pivot axis P1. FIG. 13 illustrates the mounting bracket 38 which is connected to the underside of the seat pan 12. The mounting bracket 38 is attached to a hollow tubular shaft 39 which is rotatably located through the annulus 33, thus enabling the seat pan 12 to pivot about the pivot axis P1. The tubular shaft 39 is located at the front edge of the seat pan 12. The tubular shaft 39 is hollow and adapted to receive the shaft 27 of the cam member 26. Thus, the shaft 27 of the cam member 26 is able to rotate within the tubular shaft 39, and the tubular shaft 39 is able to rotate within the annulus 33. The tubular shaft 39 is also supported by the annulus 33, and thus the annulus 33 (and its counterpart on the other side of the seat) bears the weight of the seat pan 12 and the user in use.

Figure 14:
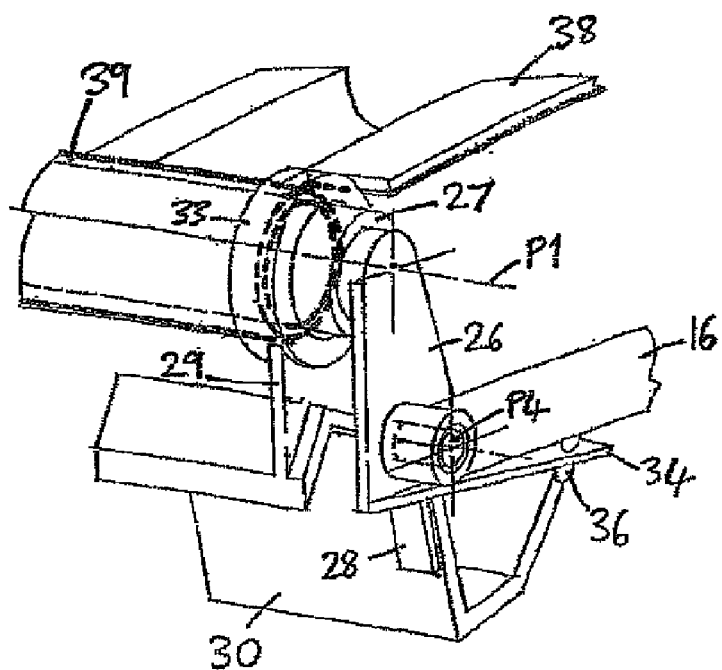
Figure 15:
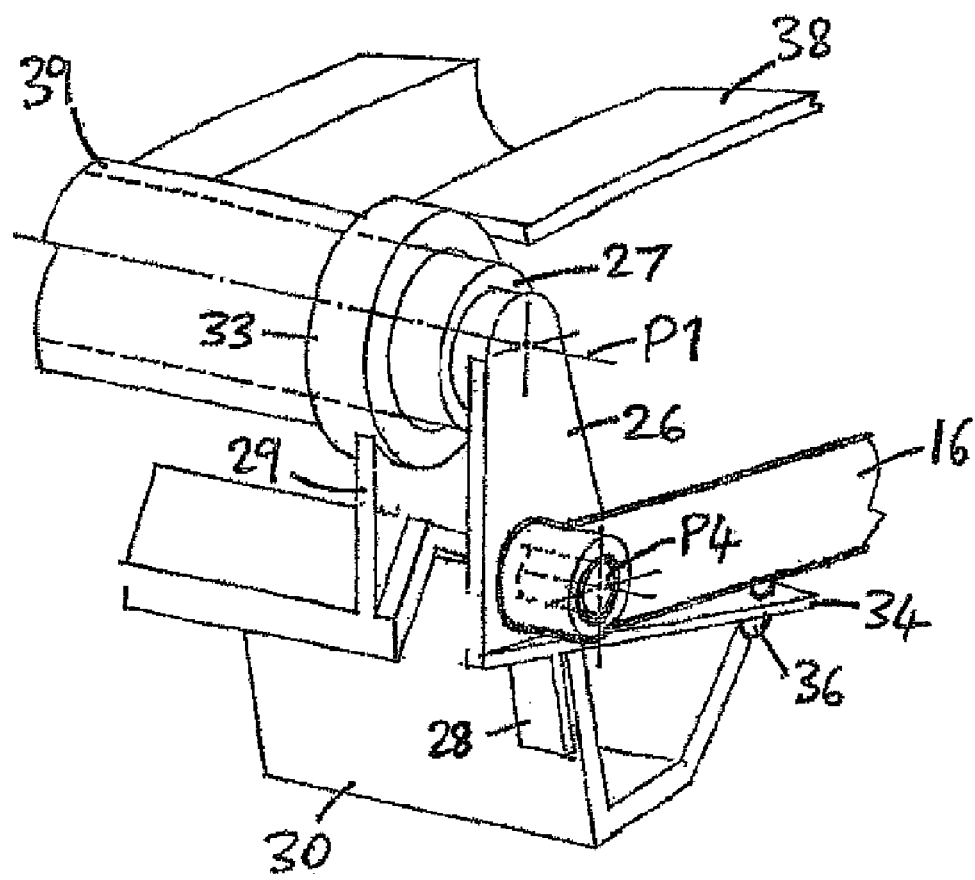
Figure 16A:
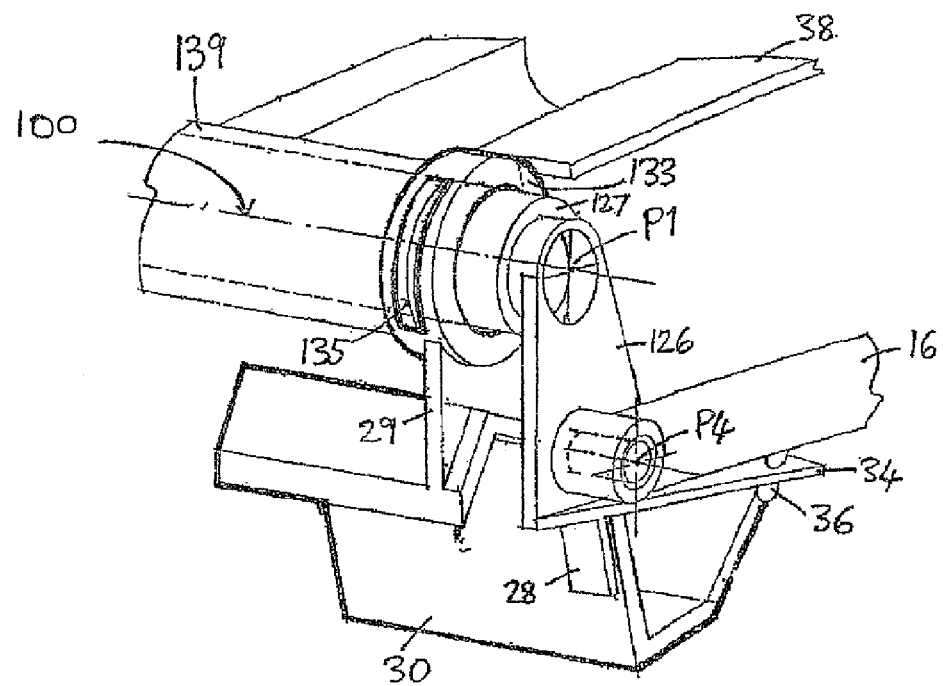
FIG. 16a illustrates alternative components of the pivot arrangement, adapted to accommodate a torsion bar.
Figure 16B:
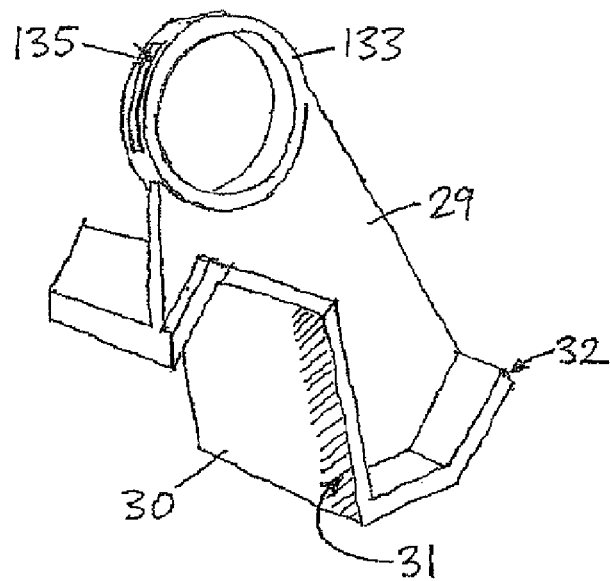

FIG. 14 illustrates the connecting rod 16 (or 17) in more detail, including the lug 36. The connecting rod 16 is connected to the cam member 26 about pivot axis P4. Although, in the preferred embodiment, the lug 36 protrudes from the connecting rod 16 and the aperture or recess for receiving the lug is provided in the flange 34, in an alternative embodiment the flange 34 may incorporate the lug and the aperture or recess may be provided within the connecting rod 16.

A torsion bar may be provided within the centre of the shaft 27 of the cam member 26, along the centre line of pivot axis P1. This necessitates design modifications to the shaft 27 of the cam member 26, the annulus 33, and the tubular shaft 39, giving the configuration illustrated in FIGS. 16*a*, 16*b*, 17, 18 and 19 (implementing new reference numerals for the modified components). If employed, the torsion bar 100 runs through the centre of the shaft 127 of the cam member 126. Consequently, the shaft 127 of the cam member 126 is now tubular. The shaft 127 of the cam member 126 runs inside the tubular shaft 139 that is attached to the mounting bracket 38 and thence the seat pan 12. The torsion bar 100 may be solid or a tubular section. The torsion bar 100 may run between a left hand and a right hand annulus (e.g. 133) either side of a single seat, or may run between the furthest left hand annulus and the furthest right hand annulus when several seats are positioned side by side. In such cases, the torsion bar 100 may then also act as a tie bar across the width of a row of seats.

Figure 17:
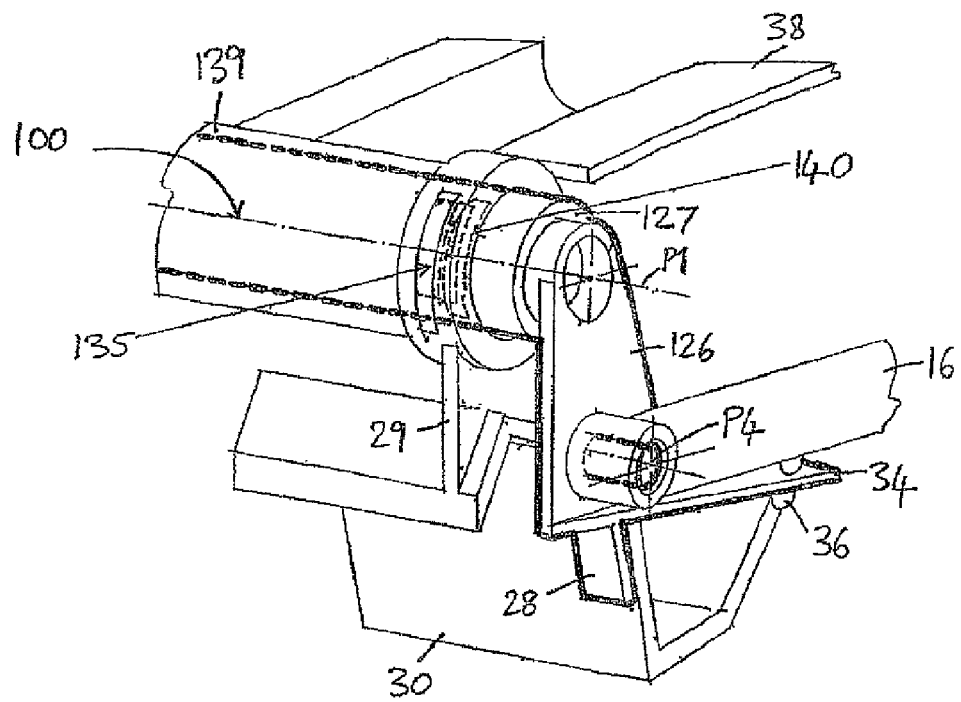
Figure 18:
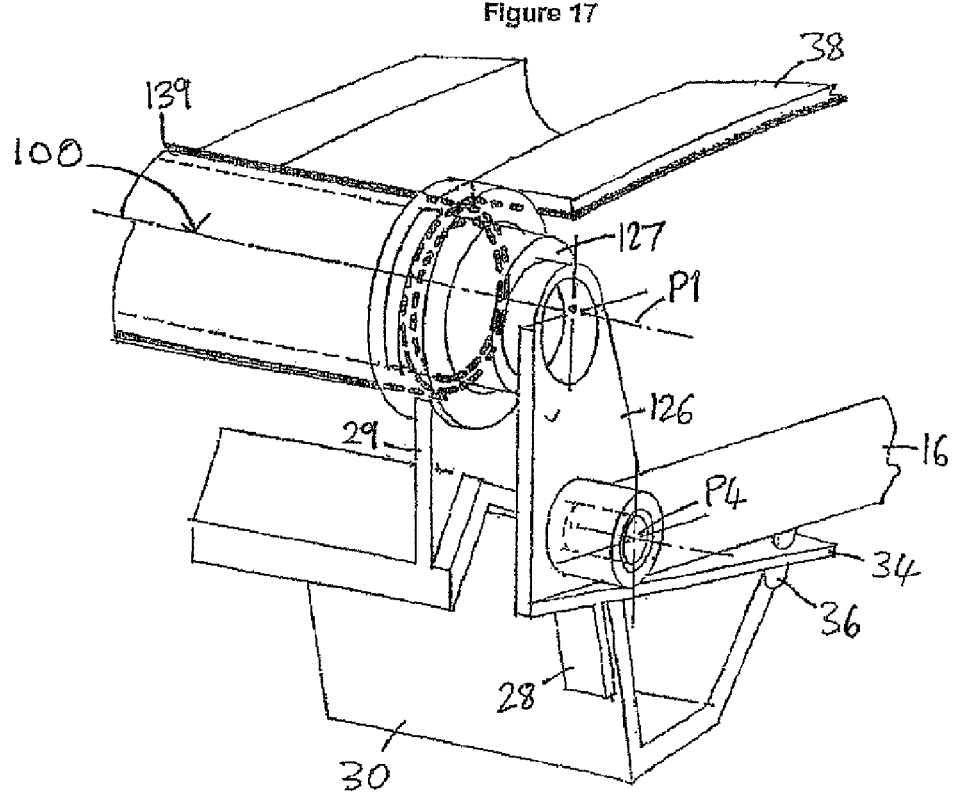
Figure 19:
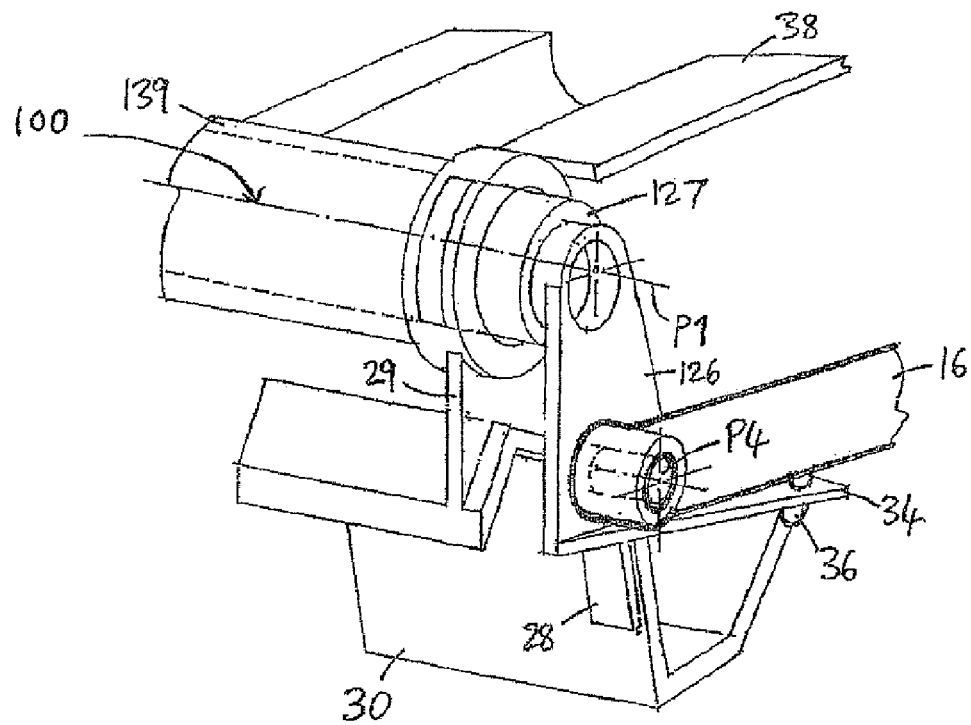

The torsion bar 100 may be fixed statically by a locking pin at the centre of the tubular shaft 139, so that torsion takes place between one annulus (e.g. 133) and the centre of the tubular shaft 139. A slot 135 may be provided in the annulus 133, though which the locking pin may be inserted. As illustrated in FIG. 17, another slot 140 may be provided through the tubular shaft 127 that is attached to the cam member 126, in order to accommodate the torsion bar locking pin. The torsion bar 100 provides a spring medium and also serves as a structural element, effectively linking the seat pan, cam member and support structure together. It also allows a more slender gas strut 24 to be employed for adjusting the angle of the seat pan 12 in use.

Instead of, or in addition to, a torsion bar 100, the first pivot axis P1 may incorporate a leaf spring, a coil spring, or any other resilient spring means, as those skilled in the art will appreciate. Such resilient spring mechanisms may also be employed in any of the other pivot axes described herein.

Inflatable Cushions and Pneumatic System

Figure 20:
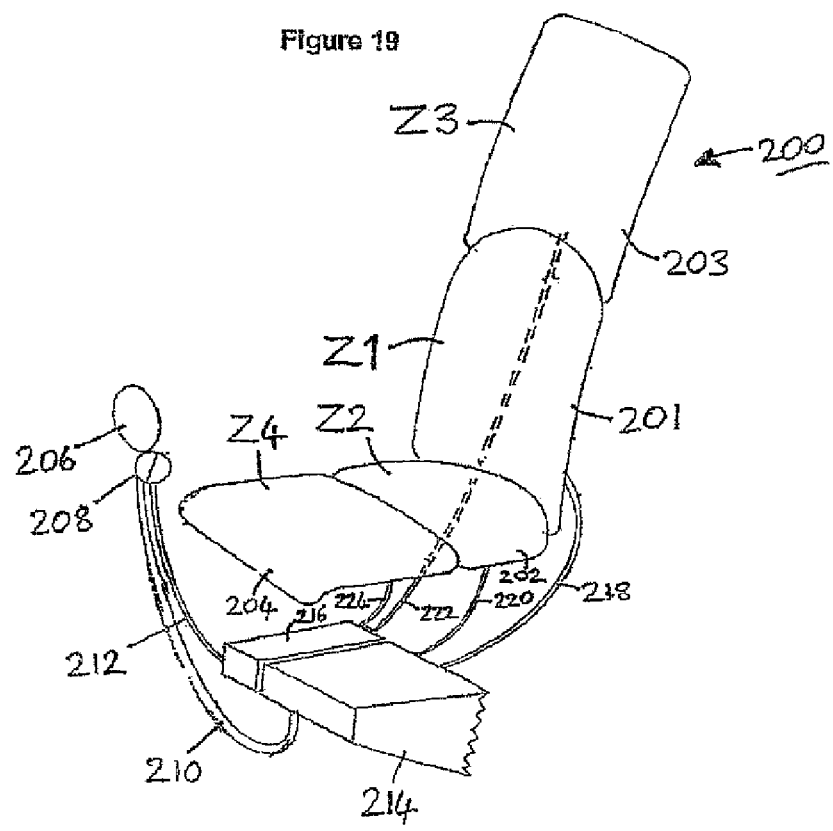
FIG. 20 illustrates an arrangement of inflatable air cushions suitable for use with the seat shown in FIGS. 1 to 19, coupled to a pair of air bellows.
Figure 21:
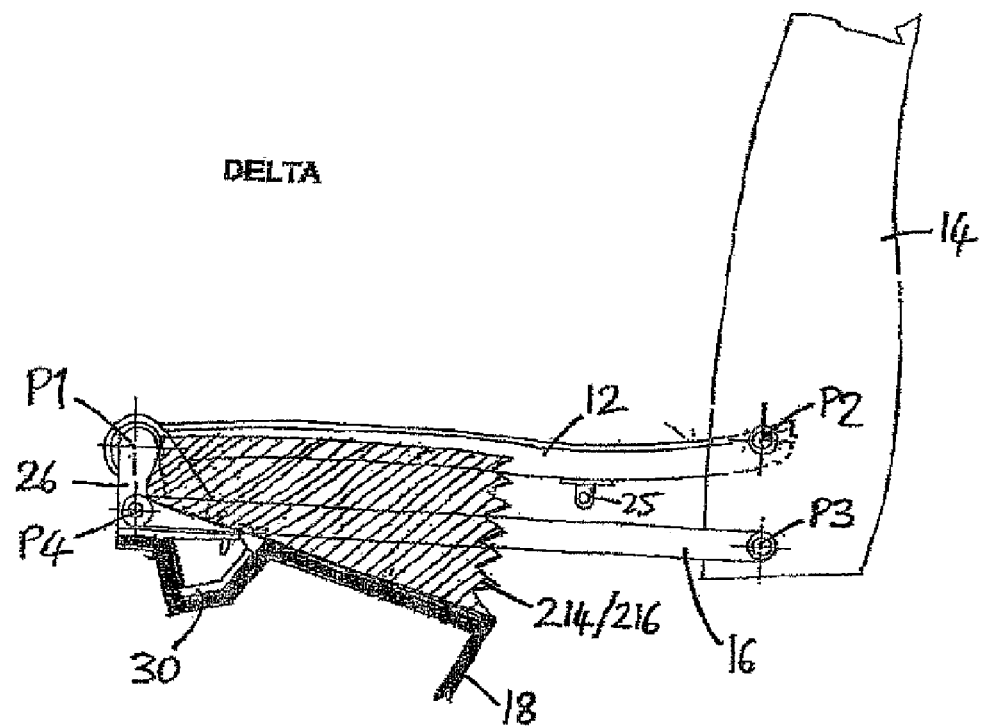
FIG. 21 illustrates the bellows of FIG. 20 arranged between the seat pan and the seat sub-assembly, here with the seat pan in the substantially horizontal "Delta" position.
Figure 22:
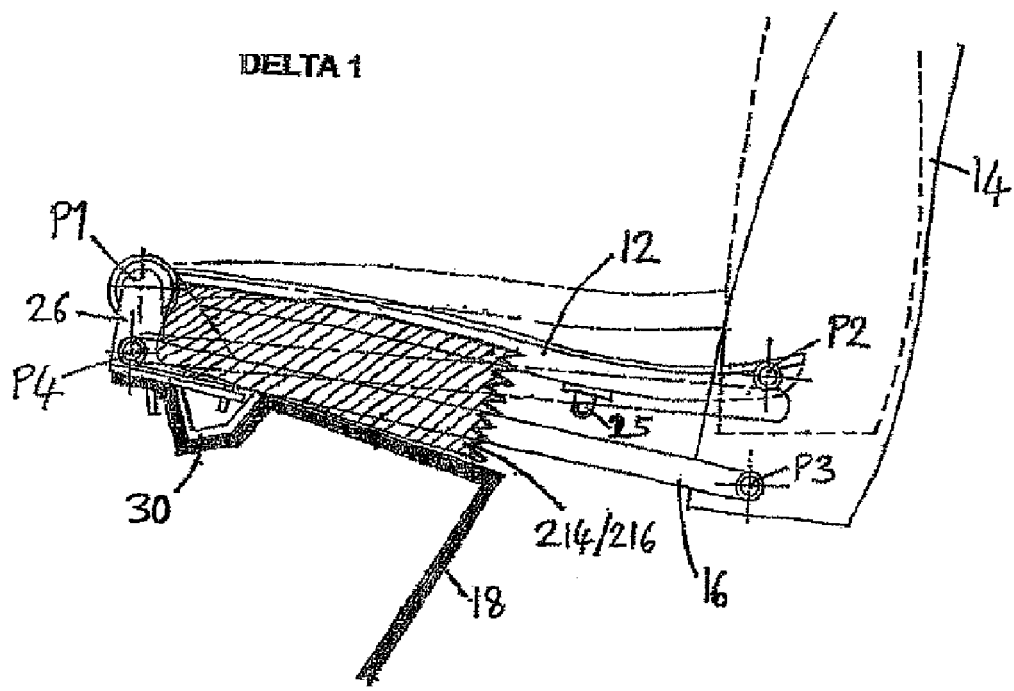
FIG. 22 illustrates the bellows of FIG. 21 having been compressed by the action of the seat pan when tilting backwards from the "Delta" position into the "Delta 1" position.

FIGS. 20, 21 and 22 illustrate an arrangement of inflatable cushions and a pneumatic system which may be used in combination with the seat kinematics described above.

FIG. 20 shows an overview of the pneumatic system 200, which in this example comprises four inflatable air bladders 201, 202, 203, 204, which serve as inflatable cushions for the passenger seat, replacing conventional (e.g. foam-filled) cushions. Upholstery may be attached over the inflatable cushions, e.g. using Velcro® or some other fastening means, to enable simple installation, maintenance and repairs.

In this example, the air bladders or cushions 201, 202, 203, 204 are arranged in four separate body support zones, Z1, Z2, Z3 and Z4. Zone Z1 provides lumbar support, zone Z2 provides ischia support, zone Z3 provides shoulder support, and zone Z4 provides thigh support. It will be appreciated that the pneumatic system 200 may be reconfigured to provide more, or fewer, zones as appropriate for a specific application.

Each air bladder or cushion 201, 202, 203, 204 is preferably formed as a number of separate inflatable cells, separated by valves so that the air contained within the cells is transferred slowly from one cell to another and is not suddenly displaced as the user's body changes posture and hence varies pressure over a cushion surface. This provides consistent comfortable support for the user's body, regardless of whether the user remains relatively still or moves from side to side. There may be, for example, nine cells per zone, e.g. in a 3×3 arrangement.

The whole pneumatic system 200 is pressurised using a pump 206 and regulated by a valve 208 to be at a nominal set pressure. The pump 206 may be a hand-operated manual pump, or mechanically operated, or motorised, or electrically powered.

The pump 206 can be operated to increase the pressure in the system 200. The valve 208 can be operated to reduce the pressure in the system 200.

Increasing the pressure in one or more cushions increases the plumpness and firmness of the cushions. Conversely, decreasing the pressure decreases the plumpness and firmness of the cushions.

A pair of bellows 214 and 216 are in communication with the pump 206 and valve 208, via air lines 210 and 212. The first bellow 214 is larger than the second bellow 216. The first bellow 214 is in communication with inflatable cushions 201 and 202 via air lines 218 and 220 respectively, and thus bellow 214 is at the same pressure as cushions 201 and 202. The second bellow 216 is in communication with inflatable cushions 203 and 204 via air lines 222 and 224 respectively, and thus bellow 216 is at the same pressure as cushions 203 and 204.

The bellows 214 and 216 can have their pressure increased together by operation of the pump 206. The pressure in either bellow 214 or 216 may be decreased separately by the valve 208, but generally not below the nominal set pressure set on the valve 208.

As illustrated in FIGS. 21 and 22, the bellows 214 and 216 may be mounted between the underside of the seat pan 12 and the fixed support structure 18. Thus, backward tilting of the seat pan 12, from the "Delta" position (as shown in FIG. 21) to the "Delta 1" position (as shown in FIG. 22) causes the bellows 214 and 216 to be compressed, which consequently causes the pressure in the bellows and the associated air cushions to be increased. That is, compression of bellow 214 causes the pressure in cushions 201 and 202 to be increased, and compression of bellow 216 causes the pressure in cushions 203 and 204 to be increased.

As shown in FIG. 20, bellow 214 is larger than bellow 216, and accordingly compression of the two bellows in unison, by backward tilting of the seat pan 12 about the front pivot axis P1, causes a greater increase in pressure in cushions 201 and 202, compared to that experienced by cushions 203 and 204. This arrangement is specifically designed in order to provide firmer cushioning to the user's lumbar and ischia regions (as supported by cushions 201 and 202) when the seat tilts backwards into the "Delta 1" position, since in the "Delta 1" position more of the user's weight is transferred backwards onto his back. A smaller pressure increase is required in the shoulder and thigh regions (as supported by cushions 203 and 204), and thus the corresponding bellow 216 is smaller.

In practice, the pneumatic system 200 and the bellows 214, 216 may be inflated to the nominal set pressure when the seat is in the "Delta" position. Pressure can then be increased using the pump 206 if necessary. The bellows 214, 216 are compressed if the seat pan 12 is pivoted from the "Delta" position into the "Delta 1" position, and are expanded again if the seat pan 12 is pivoted back from the "Delta 1" position to the "Delta" position. However, the bellows 214, 216 are preferably engineered such that they are restrained from expanding further if the seat pan 12 is pivoted upwards from the "Delta" position into the "Delta 2" position. Thus, when the seat pan 12 goes into the "Delta 2" position, the bellows 214, 216 remain the size they are when the seat pan is in the "Delta" position.

Pressure changes in each bellow 214 and 216 (e.g. resulting from operation of the pump 206 to increase pressure, operation of the valve 208 to decrease pressure, or tilting of the seat pan 12 down or up), are transferred to the corresponding cushions 201, 202, 203, 204 via the air lines 218, 220, 222, 224. Actuating the valve 208 or the pump 206 allows further pressure adjustments as the seat is tilted backwards or forwards.

Tilting movement of the seat pan 12 back and forth, which compresses and decompresses the bellows 214, 216, may also be used to provide a pumping effect to add air pressure to the system. This may be used to restore the nominal pressure in the system 200 if the pressure should fall below the nominal pressure set by the valve 208.

Folding Armrests

A folding armrest is illustrated schematically in FIGS. 23 to 27, which may be used with the passenger seat described above. A possible shape of the armrest is illustrated in FIGS. 28*a*, 28*b* and 28*c*. The armrest is designed to pivot compactly, in order to provide clear space between seats and/or to minimise the space the armrest occupies between seats, and also to minimise the volume of swept space taken up during its deployment from its stowed position to its in-use position.

As illustrated in FIGS. 23 to 27 using a schematic seat profile 300 and a schematic armrest profile 302, the armrest mechanism employs two pivot axes 304, 306. Further, as illustrated in FIGS. 28*a* and 28*b*, the armrest 302 has a relatively small thickness (as shown in FIG. 28*b*) compared to its width (as shown in FIG. 28*a*) when in its in-use configuration.

The first pivot axis 304 pivotally couples the armrest 302 to the side of the seat shell 300 at an appropriate height with respect to the top surface of the seat cushion and the desired position of the top surface of the armrest when in use. The second pivot axis 306 allows the armrest 302 to rotate 90° about its long axis so that, as it is dropped down, it presents its wider surface as a top surface on which the use may rest his arm.

Figure 23:
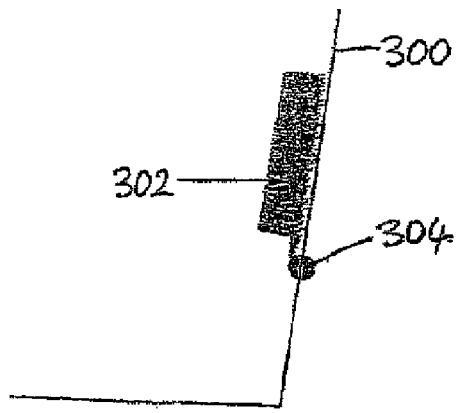
FIG. 23 illustrates schematically a folding armrest in its hinged up, stowed position.
Figure 24:
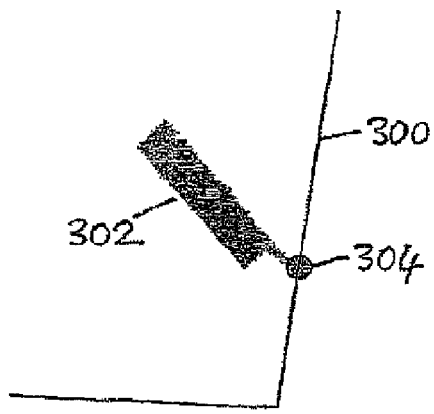
FIG. 24 illustrates the armrest of FIG. 23, partially lowered.
Figure 25:
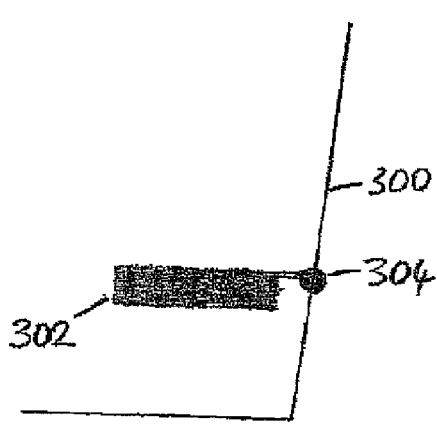
FIG. 25 illustrates the armrest of FIGS. 23 and 24, fully lowered.
Figure 26:
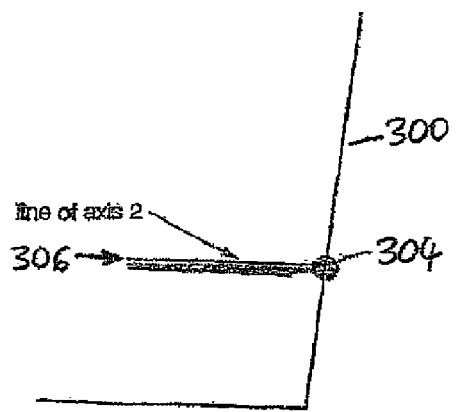
FIG. 26 illustrates the armrest of FIGS. 23, 24 and 25, rotated into its in-use position.

In FIG. 23, the armrest 302 is folded up alongside the backrest of the seat 300, with the wider surface of the armrest 302 adjacent the backrest. Thus, when stowed in this position, the armrest 302 protrudes from the side of the seat only by the extent of its thickness, not its width. FIG. 24 shows the armrest 302 pivoting downwards about the first pivot axis 304, and then reaching the horizontal position as illustrated in FIG. 25. Then, in FIG. 26, the armrest 302 is rotated though 90° about the second pivot axis 306 which runs along the long axis of the armrest, i.e. parallel to the longitudinal dimension of the armrest. Guides and/or detents may be provided to restrict the extent of rotation of the armrest about the second pivot axis 306, such that the armrest may only pivot through the desired angle of 90°. The armrest is thus rotated such the wide flat surface is presented uppermost, ready for use.

Figure 27:
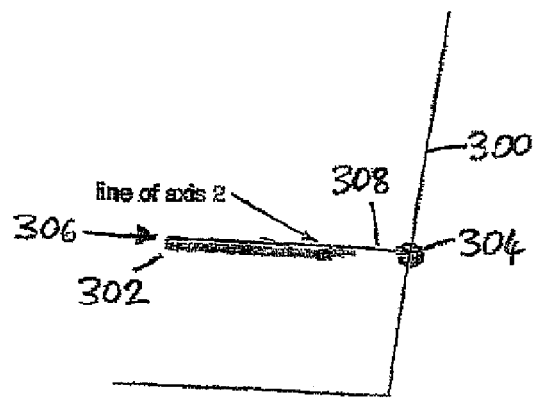
FIG. 27 illustrates the armrest of FIG. 26 in an extended configuration.
Figure 28A:
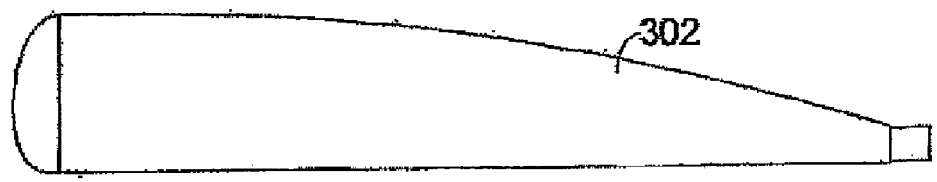
Figure 28B:
Figure 28C:

In FIG. 27 it is illustrated that the armrest 302 may incorporate a shaft 308 that is sliceable within the armrest 302 (or some other length-extending means such as a telescopic shaft or a gas strut, etc.) which enables the armrest pad to be extended outwards along its long axis. This may be used to increase the dimension of the armrest 302 from its forward edge to its fixing pivot on the backrest shell, thus enabling different users' preferences, body shapes or morphologies to be accommodated.

As illustrated in FIG. 28a, which shows the armrest from above when in use, the armrest 302 is preferably profiled to conform around a user's body when in its in-use configuration; the user's torso would be situated adjacent the curved long side of the armrest 302. This increases the amount of usable armrest space available to the user, without encroaching on a neighbouring passenger's space or digging into the user's torso.

The seat kinematics as described herein and as illustrated in FIGS. 1 to 19 may be employed separately, or in combination with the inflatable cushions and pneumatic system of FIGS. 20 to 22, and/or in combination with the armrest configuration of FIGS. 23 to 28. Similarly, the inflatable cushions and pneumatic system of FIGS. 20 to 22 may be employed separately, or in combination with the seat kinematics of FIGS. 1 to 19, and/or in combination with the armrest configuration of FIGS. 23 to 28. Further, the armrest of FIGS. 23 to 28 may be employed separately, or in combination with the seat kinematics, and/or in combination with the inflatable cushions and pneumatic system.

Curved Seat Back Shell of Backrest

Figure 29A:
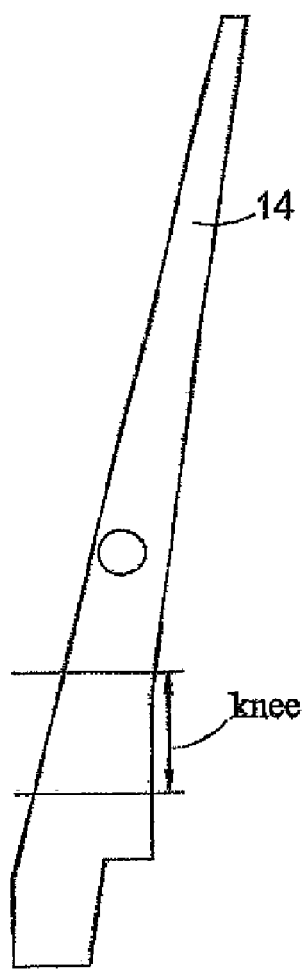
FIGS. 29a, 29b, 29c and 29d illustrate the shell of the seat backrest, respectively in side elevation, rear elevation and upper (A-A) and lower (B-B) horizontal sections.
Figure 29B:
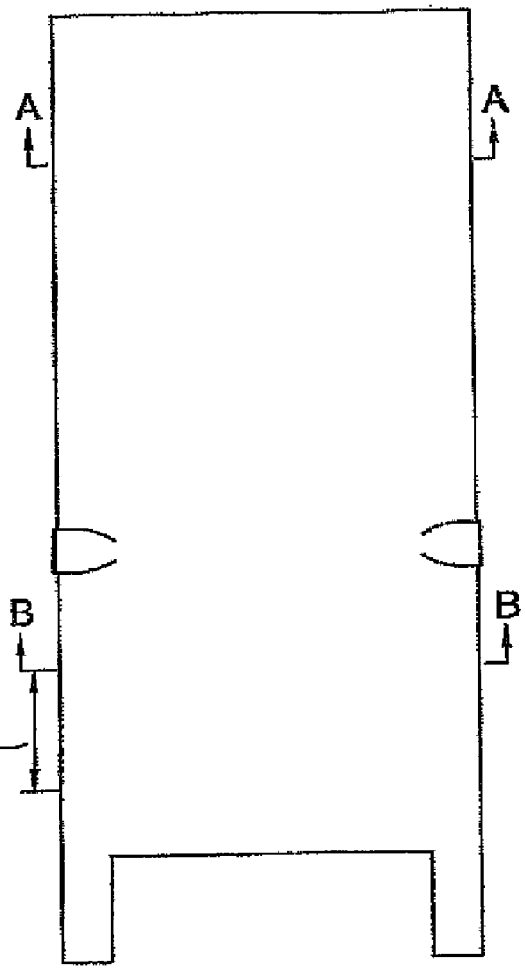
Figure 29C:
Figure 29D:
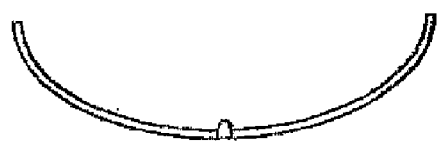

Referring to FIGS. 29a, 29b and 29c, these show the moulded seat back shell of the backrest 14 for use in aircraft seats and which is radically different from conventional aircraft seats. The seat back shell of the backrest 14 is formed with a forwardly concave curved cross-section toward its lower end as is clear from FIG. 29d. This region is proximate where the knees of the passenger seated behind will generally be and provides a substantial amount of clearance for that rear seated passengers knees. The forward sweeping sides 14a of the seat back rest shell 14 can give up to an extra 13 cm or even more in extra space for the rear seated passengers knees and which can, multiplied over the length of a relatively large passenger aircraft with forty or more rows of seats, give rise to sufficient extra space for additional rows of seats, greatly enhancing the economics of running the aircraft and more than paying for the costs of the modifications in design of the seat. It will be seen from FIGS. 29a to 29d that the forwardly curved seat back rest shell 14 tapers to become substantially flat at its uppermost edge as can be seen in FIG. 29c. This suits the ergonomic needs of both front and rear passengers and facilitates compatibility with video monitor mountings and seat back tray mountings as used in most present aircraft. It will be appreciated that the conventional aircraft seat design has a substantially flat seat back shell of the backrest for the full height of the backrest, without any such forward sweeping curvature of the bottom part of the backrest.

Second Major Embodiment of Kinematic System

Figure 30:
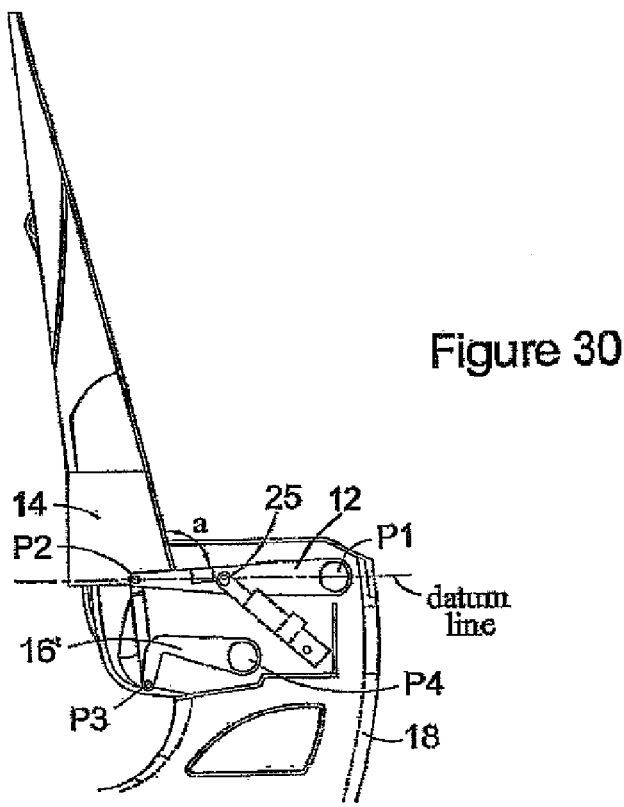
FIGS. 30 to 32 illustrate a second major embodiment of the seat kinematic adjustment arrangement, showing respectively the Delta, Delta 1 and Delta 2 positions.

FIGS. 30 to 33 illustrate the second major embodiment of kinematic system to achieve the desired adjustability of the seat between Delta, Delta 1 and Delta 2 positions FIG. 30 shows this embodiment in its rest, delta, position with the seat pan 12 substantially horizontal/level to the floor. Again, the seat pan 12 is pivoted to the seat structure 18 at pivot axis P1 along the front edge of the seat pan 12 and again the first pivot axis P1 is static in use of the seat, remaining at the same height and position relative to the floor level of the aircraft throughout the various repositioning modes of the seats.

As with the first preferred embodiment, the backrest 14 is pivotally coupled to the rear of the seat pan 12 by a second pivot axis P2 extending across the rear of the seat pan 12. The arrangement also has a third pivot axis P3 that couples a first structural member or con rod 16 to a lower edge of the backrest 14. The opposing end of the first structural member/connecting rod 16 is pivotally coupled to the seat structure 18 about fourth pivot axis P4. Like the first preferred embodiment, in the second embodiment the fourth pivot axis P4 is relatively forward of the third pivot axis P3, but it is not substantially at or near the front edge of the seat pan 12. A second structural member or connecting rod 40 is provided linking the third pivot axis P3 to the second pivot axis P2. This is distinct to the arrangement in the first preferred embodiment where there is no connecting link between the second and third pivot axes P2, P3. Furthermore, in the second embodiment there is no connecting link between the first and fourth pivot axes P1, P4. As with the first preferred embodiment, a gas strut 24' is provided pivotally coupled to the underside of the seat pan 12 about a fifth pivot axis 25.

Figure 31:
Figure 31:
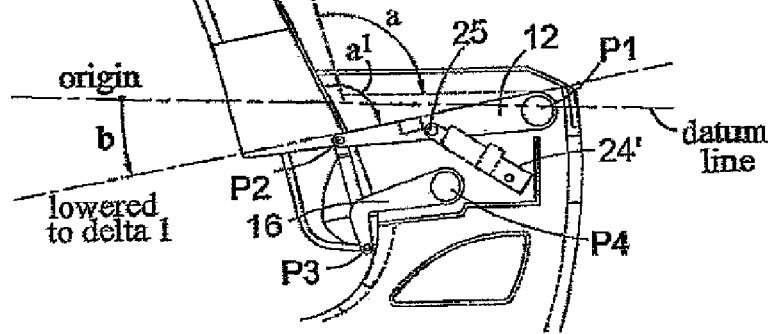

Turning to FIG. 31, the reclining/rearward tilting movement of the seat to its reclined position, Delta 1, involves the seat pan 12 tilting rearwardly downwardly at its rear about the first pivot axis P1 and as in the first preferred embodiment the backrest 14 maintains its angular relationship to the seat pan 12 (angle 'a'=angle 'a1'). The seat pan 12 moves downwardly by an angle b that is the same as the angle b1 by which the seat backrest 14 moves downwardly/rearwardly.

Figure 32:
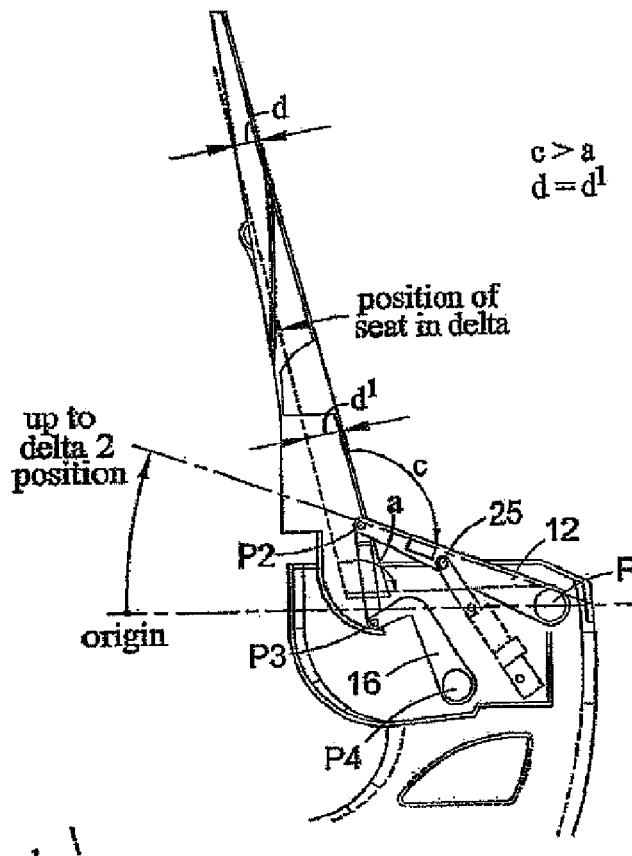

Referring to FIG. 32, this shows the Delta 2 position of the second preferred embodiment of seat arrangement and it can be seen that the seat pan 12 is tilted upwardly/forwardly about the first pivot axis P1 and that the angle between the seat pan 12 and backrest 14 has enlarged from a marginally greater than right angular angle 'a' to a substantially obtuse angle 'c' that is of the order of 110° or more. This change of angle between the seat pan 12 and backrest 14 serves to maintain the orientation of the backrest 14 relative to the floor of the aircraft while the seat pan 12 is tilted forwardly.

In the first preferred embodiment only the first pivot axis P1 was fixed relative to the floor, whilst the second pivot axis P2 rotated on an arc relative to the first pivot axis P1 and the third pivot axis P3 was fixed relative to the second pivot axis P2. The fourth pivot axis P4 moved in an arc relative to the first pivot axis P1 and was locked to the first pivot axis P1 in the Delta position moving to Delta 2 position but released to be free to move forward in the Delta to Delta 1 movement. By contrast, in this second preferred embodiment, the first pivot axis P1 and fourth pivot axis P4 are both fixed, whilst the second pivot axis P2 and third pivot axis P3 move in space on two arcs from the first pivot axis P1 and fourth pivot axis P4, respectively. Accordingly, this second preferred embodiment achieves the same unique kinematics of the first preferred embodiment but with a different articulating linkage arrangement. The arrangement of the second preferred embodiment is stronger and is preferred for use in aircraft, whereas the arrangement of the first preferred embodiment is most suitable for use in non-travelling seats such as office chairs etc. where cost economy is more important than strength.

Figure 33:
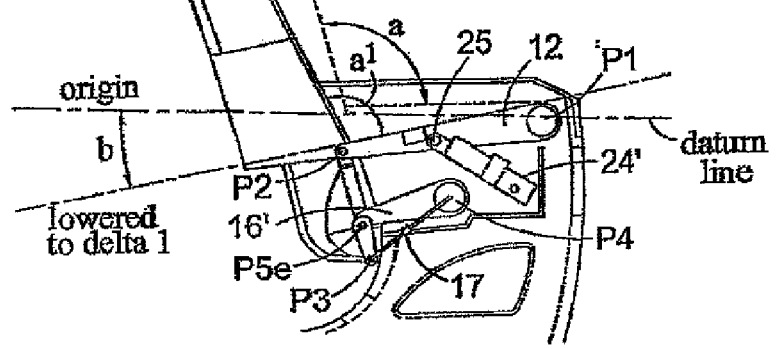
FIG. 33 illustrates a variant of the second major embodiment at the Delta 2 position.

Turning to FIG. 33, this shows the variant of the second preferred embodiment of kinematic arrangement/articulating linkage in which the first structural member linking the third pivot axis and fourth pivot axis, P3, P4, is split into two components. Unlike the single L-shaped connecting rod 16 of FIGS. 30 to 32, the stem and branch of the L-shaped component are replaced by a separate stem 16' and a branch P5e pivotally coupled to the stem 16' and which is in turn coupled to the backrest 14 about the third pivot axis P3. As with the first preferred embodiment, this formation of the structural member 16 as two separate articulating parts enables the first structural member 16 to be of adjustable length so that the angle of the backrest relative to the seat pan can be adjusted independently of the Delta to Delta 2 adjustment movement.

Turning to FIGS. 34a to 34c, these are summary drawings that summarise the three primary kinematic positions of the seat. FIG. 34a shows the rest position Delta with the seat pan 12 substantially horizontal/plane parallel to the floor and with the backrest 14 substantially upright such as is generally required in aircraft for take-off and landing. FIG. 34*b* shows the seat back reclined position Delta 1, with the angle between seat backrest 14 and seat pan 12 being unaltered in the reclined position where the seat back 14' and seat pan 12' are at the same angle relative to each other.

In FIG. 34*c*, the seat occupant has adjusted the seat to have the seat pan 12 moved to the tilted upward/forward position 12", the Delta 2 position, and with the seat backrest 14 moving forward to a forward position 14" but not changing in its inclination relative to the floor level.

Summary of Some of the Features and Some Further Features

A degree of adjustability in seat height, backward tilt and forward tilt of the seat pan and backrest assembly is provided by virtue of the pivot point being common and situated at or near the front edge of the seat pan, thus allowing the seat assembly to tilt back or the seating surface to tilt up on its own. FIG. 1 shows the seat pan in its substantially horizontal "Delta" position, FIG. 2 shows the seat in one of its range of tilted back "Delta 1" positions, and FIG. 3 shows the seat in one of its range of tilted forwards "Delta 2" positions.

Backward or forward tilt of the seat assembly is enabled by the pivot axis provided directly below or close to the knee articulation of the seated person, thus maintaining the floor-to-pivot dimension and the knee height whilst any of the tilt actions of the seat assembly are performed.

The seat assembly can tilt from the "Delta" position to the "Delta 1" position without a change in the angle between the backrest and the seat pan surface, or with a change in the angle between the backrest and the seat pan surface. The backrest can tilt backwards (e.g. FIG. 4), or forwards. The seat pan and backrest common pivot point may be adjustable in height whichever tilt kinematics are used.

The seat kinematics allow seat height adjustment, seat depth adjustment, tilt back adjustment and tilt upward adjustment. The controls and adjustment mechanisms for the seat position and the cushion pressure may be manual and/or mechanically assisted. Other embodiments of the seat are possible, with the seat features and functions being totally power assisted, or partially power assisted, e.g. electrically, pneumatically, hydraulically, or by other means. All adjustments may be performed and controlled by manual mechanical means or by power assisted mechanical means.

A seat belt anchorage may be fixed to any of the assemblies described herein. A storage container may be provided below the seat opening and accessible from the rear of the seat.

Inflatable cushions or bladders may be provided on the seat pan surface and the backrest surface to support the user's body. The inflatable cushions may constructed using separate gas bladders linked to a primary gas pump allowing an increased or decreased pressure of a secondary bellow gas pump reacting automatically to the body-weight of the user and the users chosen seat inclination, thus redistributing the gas pressure between the cushion bladders as body weight pressure points are redistributed on the seat and cushion surfaces following a change of seat assembly inclination. The inflatable cushions may be connected to an inflatable bellow or pump by way of tubes and valves which, under compression or expansion resulting from the movements of the seat pan or backrest shell, regulate the pressure of the backrest cushion or seat pan cushion. The said bellow or pump may itself be pressurised by a separate manual or power assisted pump. The air bladders may be directly enclosed by an upholstery bag or cover.

An armrest may be provided which deploys from a vertical up folded position to a horizontal rest position, and which occupies a minimum amount of swept space in its deployment. The armrest may also be length-adjustable, in order to adapt to different users' arm morphology, body shapes and preferences.

The invention claimed is:

1. A seat comprising a seat pan, a backrest and a support structure, the seat pan having a front and a rear, wherein the seat pan is pivotally coupled to the support structure about a first pivot axis (P1) provided extending across the seat pan substantially at the front edge of the seat pan, such that the seat pan may be pivoted about the said first pivot axis in use, and the angle of the seat pan relative to the support structure may thus be adjusted, the backrest being pivotally coupled to the seat pan about a second pivot axis (P2) extending across the seat pan substantially at the rear of the seat pan, such that the angle of the backrest relative to the seat pan may be adjusted in use, the backrest being linked to the support structure by an articulating linkage, the articulating linkage comprising a first structural member pivotally coupled to the backrest about a third pivot axis (P3) and pivotally coupled to the support structure about a fourth pivot axis (P4), the fourth pivot axis being located forwards of the third pivot axis, whereby in one mode of operation as the backrest moves forward during forward tilting movement of the seat from a rest position (Delta) to a second position (Delta 2) the seat pan rear tilts upwardly relative to the seat pan front about the first pivot axis, the articulating linkage tilts upwardly about the fourth pivot axis, and the backrest rises therewith but the angle between the seat pan and backrest adjusts substantially simultaneously so that the backrest's angle of incline relative to a level of the floor on which the seat is located in use is substantially unaltered and, wherein the articulating linkage is configured to enable the seat to recline to a third, reclined, position (Delta 1), tilted downwardly from the rest position about the first pivot axis whereby the backrest moves rearwardly, the seat pan rear tilts downwardly relative to the seat pan front the positions of the seat pan and the articulating linkage are fixed relative to each other, and the backrest lowers with the seat pan rear and with the angle between the seat pan and backrest fixed so that the backrest's angle of incline relative to the floor level is altered to incline rearwardly.

2. A seat as claimed in claim 1, wherein the seat pan is coupled to a seat pan adjustment device, the seat pan adjustment device being operable to adjust the angle of the seat pan relative to the support structure in use.

3. A seat as claimed in claim 2, wherein the first pivot axis incorporates resilient means such as a torsion bar, a leaf spring or a coil spring.

4. A seat as claimed in claim 1, wherein the first pivot axis incorporates resilient means such as a torsion bar, a leaf spring or a coil spring.

5. A seat as claimed in claim 1, wherein the first structural member is of fixed length.

6. A seat as claimed in claim 2, wherein the seat pan adjustment device adjusts the length between the third and fourth pivot axes so that the backrest may tilt about the second pivot as the third or fourth pivot axes move.

7. A seat as claimed in claim 1, wherein the first structural member is of adjustable length, such that adjustment of its length causes the angle of the backrest relative to the seat pan to be adjusted.

8. A seat as claimed in claim 1, wherein the first pivot axis is fixed relative to the floor, on which the seat is located in use.

9. A seat as claimed in claim 1, further comprising a second structural member arranged to couple the first pivot axis to the fourth pivot axis.

10. A seat as claimed in claim 9, wherein the said first structural member is engageable with or against the said second structural member such that, when engaged, the first and second structural members are movable having a fixed angle relative to one another.

11. A seat as claimed in claim 10, wherein one of the first or second structural members is provided with a pin or lug, and the other of the first or second structural members is provided with a recess or aperture in which the said pin or lug can locate.

12. A seat as claimed in claim 11, wherein the second structural member is provided with a flange against which the first structural member can abut.

13. A seat as claimed in claim 11, wherein the first and second structural members are arranged such that the first structural member may pivot upwards relative to the second structural member during upward motion of the first structural member, but such that the first structural member is angularly engaged with the second structural member during downward motion of the first structural member.

14. A seat as claimed in claim 10, wherein the second structural member is provided with a flange against which the first structural member can abut.

15. A seat as claimed in claim 10, wherein the first and second structural members are arranged such that the first structural member may pivot upwards relative to the second structural member during upward motion of the first structural member, but such that the first structural member is angularly engaged with the second structural member during downward motion of the first structural member.

16. A seat as claimed in claim 9, wherein the second structural member is provided with a stay arranged to butt against a third structural member when the first structural member is moved upwards, but such that the stay can move away from the third structural member when the first structural member is moved downwards.

17. A seat as claimed in claim 16, wherein the stay is arranged to butt against the third structural member substantially at a point during upward motion of the first structural member at which the first structural member disengages from the second structural member.

18. A seat as claimed in claim 17, wherein the third structural member is fixedly attached to, or integral with, the support structure.

19. A seat as claimed in claim 16, wherein the third structural member is fixedly attached to, or integral with, the support structure.

20. A seat as claimed in claim 2, wherein the seat pan adjustment device is pivotally coupled to the seat pan about a fifth pivot axis.

21. A seat as claimed in claim 20, wherein the seat pan adjustment device is attached to the support structure or the third structural member.

22. A seat as claimed in claim 1, wherein the second pivotal axis and third pivotal axis are mechanically linked together while the first pivotal axis and fourth pivotal axis are not mechanically linked together.

23. A seat as claimed in claim 1, wherein the fourth pivot axis is fixed and the second and third pivot axes are movable about the first and fourth pivot axes respectively.

24. A seat as claimed in claim 1, wherein the first structural member is elbow-shaped, comprising a stem part and a branch part.

25. A seat as claimed in claim 24, wherein the first structural member has the stem part pivoted to the branch part whereby the angle between the seat pan and backrest may be adjusted.

26. A seat as claimed in claim 20, wherein the seat is an aircraft passenger seat.

27. A seat as claimed in claim 1, wherein the backrest has a shell that has a marked forwardly concave, rearwardly convex curved cross-section in its lower region whereby a passenger/person seated immediately behind the seat is afforded additional legroom for their knees that is suitably of the order of 5 cm and greater and preferably 10 cm and greater.

28. A seat as claimed in claim 27, wherein the backrest has a relatively flat cross-section in its upper region.

* * * * *